US009956726B2

(12) United States Patent
Okamoto et al.

(10) Patent No.: US 9,956,726 B2
(45) Date of Patent: May 1, 2018

(54) APPARATUS FOR PRODUCING THREE-DIMENSIONAL STRUCTURE, METHOD OF PRODUCING THREE-DIMENSIONAL STRUCTURE, AND THREE-DIMENSIONAL STRUCTURE

(71) Applicant: SEIKO EPSON CORPORATION, Tokyo (JP)

(72) Inventors: Eiji Okamoto, Nagano (JP); Junichi Goto, Nagano (JP)

(73) Assignee: Seiko Epson Corporation, Tokyo (JP)

(*) Notice: Subject to any disclaimer, the term of this patent is extended or adjusted under 35 U.S.C. 154(b) by 537 days.

(21) Appl. No.: 14/643,481

(22) Filed: Mar. 10, 2015

(65) Prior Publication Data

US 2015/0266240 A1 Sep. 24, 2015

(30) Foreign Application Priority Data

Mar. 18, 2014 (JP) ................... 2014-054503

(51) Int. Cl.
B29C 67/00 (2017.01)
B29C 64/165 (2017.01)
B29C 64/20 (2017.01)
B29L 31/00 (2006.01)
B33Y 10/00 (2015.01)
B33Y 30/00 (2015.01)

(52) U.S. Cl.
CPC ........ B29C 67/0081 (2013.01); B29C 64/165 (2017.08); B29C 64/20 (2017.08); *B29L 2031/772* (2013.01); *B33Y 10/00* (2014.12); *B33Y 30/00* (2014.12); *Y10T 428/31511* (2015.04); *Y10T 428/31551* (2015.04); *Y10T 428/31663* (2015.04)

(58) Field of Classification Search
CPC ... B29C 67/0081; B29C 64/20; B29C 64/165; B33Y 10/00; B33Y 30/00; Y10T 428/31511; Y10T 428/31551; Y10T 428/31663; B29L 2031/772
USPC ..................................................... 428/411.1
See application file for complete search history.

(56) References Cited

U.S. PATENT DOCUMENTS

| 3,732,107 | A | 5/1973 | Faust |
| 3,857,885 | A | 12/1974 | Faust |
| 4,458,006 | A | 7/1984 | Doenges et al. |
| 4,495,271 | A | 1/1985 | Geissler et al. |
| 4,530,747 | A | 7/1985 | Donges et al. |
| 4,987,053 | A | 1/1991 | Gersdorf et al. |
| 5,200,299 | A | 4/1993 | Steppan et al. |
| 6,596,224 | B1 | 7/2003 | Sachs et al. |
| 6,799,959 | B1 | 10/2004 | Tochimoto et al. |
| 9,393,740 | B2 * | 7/2016 | Okamoto ............ B29C 67/0059 |
| 9,415,545 | B2 * | 8/2016 | Okamoto ............ B29C 67/0081 |
| 9,463,614 | B2 * | 10/2016 | Okamoto ............ B29C 67/0092 |
| 9,481,162 | B2 * | 11/2016 | Okamoto ................ B29C 64/40 |
| 9,579,852 | B2 * | 2/2017 | Okamoto ............ B29C 67/0092 |
| 9,595,838 | B2 * | 3/2017 | Tanabe .................. H02J 7/0042 |
| 9,676,144 | B2 * | 6/2017 | Okamoto ............ B29C 67/0059 |

FOREIGN PATENT DOCUMENTS

| JP | 46-027926 A | 8/1971 |
| JP | 48-041708 A | 12/1973 |
| JP | 51-047334 B | 12/1976 |
| JP | 54-021726 B | 8/1979 |
| JP | 57-196231 A | 12/1982 |
| JP | 59-005240 A | 1/1984 |
| JP | 59-005241 A | 1/1984 |
| JP | 01-165613 A | 6/1989 |
| JP | 02-226149 A | 9/1990 |
| JP | 2001-334581 * | 4/2001 |
| JP | 2001-150556 * | 5/2001 |
| JP | 2001-150556 A | 6/2001 |
| JP | 2002-507940 A | 3/2002 |
| JP | 2009-084619 A | 4/2009 |
| JP | 2013-136169 A | 7/2013 |
| WO | 2013/010108 A1 | 1/2013 |

* cited by examiner

Primary Examiner — Leszek Kiliman

(57) ABSTRACT

An apparatus for producing a three-dimensional structure that produces a three-dimensional structure by laminating layers to each other using a paste-like composition containing grains includes a stage for which the composition is provided and on which the layer is formed; and a dispenser that directly supplies the composition to a forming area on the stage.

20 Claims, 8 Drawing Sheets

APPARATUS FOR PRODUCING THREE-DIMENSIONAL STRUCTURE, METHOD OF PRODUCING THREE-DIMENSIONAL STRUCTURE, AND THREE-DIMENSIONAL STRUCTURE

BACKGROUND

1. Technical Field

The present invention relates to an apparatus for producing a three-dimensional structure, a method of producing a three-dimensional structure, and a three-dimensional structure.

2. Related Art

A technique of forming a three-dimensional structure by forming material layers (unit layers) on a stage (forming table) using a composition (forming material) that contains powder (grains) and laminating them to each other is known (for example, see JP-A-2001-150556). In this technique, a three-dimensional structure is formed by repeatedly performing the following operation. First, a material layer is formed by thinly spreading powder to have a uniform thickness and a bonding unit is formed by selectively bonding powder to each other in only a desired portion of the material layer. As a result, a thin plate-like member (hereinafter, referred to as a "cross-sectional member") is formed in the bonding unit in which powder is bonded to each other. Next, another material layer is thinly formed on the material layer and a bonding unit is formed by selectively bonding powder to each other in only a desired portion of the material layer. As a result, a new cross-sectional member is formed on a newly formed material layer. At this time, the newly formed cross-sectional member is bonded to the cross-sectional member formed earlier. A three-dimensional structure can be formed by laminating thin plate-like cross-section members (bonding units) to each other one by one by repeatedly performing such an operation.

In such a technique, a three-dimensional structure is formed by temporarily supplying a composition (forming material) to a supply table which is different from the forming area, moving the composition onto the forming area (work surface), and forming layers in the entire forming area. However, since the area of the layer to be formed (area when seen in a plan view) is constant regardless of the kind of three-dimensional structure to be produced, there is a problem in that there are many compositions which are not be practically used to produce a three-dimensional structure.

SUMMARY

An advantage of some aspects of the invention is to provide an apparatus for producing a three-dimensional structure capable of efficiently producing a three-dimensional structure while reducing an amount of a composition to be used for producing a three-dimensional structure, a method of producing a three-dimensional structure capable of efficiently producing a three-dimensional structure while reducing an amount of a composition to be used for producing a three-dimensional structure, and a three-dimensional structure which is produced using the apparatus for producing a three-dimensional structure and the method of producing a three-dimensional structure.

The above-described advantages are achieved by the following aspects of the invention.

According to an aspect of the invention, there is provided an apparatus for producing a three-dimensional structure that produces a three-dimensional structure by laminating layers to each other using a paste-like composition containing grains, the apparatus including: a stage for which the composition is provided and on which the layer is formed; and a dispenser that directly supplies the composition to a forming area on the stage.

In this manner, it is possible to provide an apparatus for producing a three-dimensional structure capable of efficiently producing a three-dimensional structure while reducing an amount of the composition to be used for producing a three-dimensional structure.

In the aspect of the invention, it is preferable that the apparatus for producing a three-dimensional structure further includes a plurality the dispensers.

In this manner, it is possible to form a plurality of independent layers in regions with forming areas different from one another by performing a single process and to suitably and concurrently produce a plurality of three-dimensional structures while reducing the amount of the composition to be used.

In the apparatus for producing a three-dimensional structure according to the aspect of the invention, it is preferable that the thicknesses of the layers to be formed are made different from one another with respect to the plurality of dispensers.

In this manner, for example, it is possible to concurrently produce a plurality of three-dimensional structures with different thicknesses from one another.

In the aspect of the invention, it is preferable that the apparatus for producing a three-dimensional structure further includes a flattening unit that flattens the composition supplied by the dispenser.

In this manner, it is possible to more effectively prevent generation of unintentional unevenness in the three-dimensional structure to be produced and to make the dimensional precision of the three-dimensional structure particularly excellent.

In the apparatus for producing a three-dimensional structure according to the aspect of the invention, it is preferable that the dispenser and the flattening unit are operated independently from each other.

In this manner, for example, after the time for suitable wet-spreading of the composition has passed, it is possible for the flattening unit to perform flattening and to more suitably control the shape of a layer to be formed.

In the apparatus for producing a three-dimensional structure according to the aspect of the invention, it is preferable that the dispenser relatively moves in the in-plane direction of the stage and supplies the composition to the stage at the same time; and the flattening unit is provided in the longitudinal direction of the relative movement direction of the dispenser.

In this manner, it is possible to make the productivity of the three-dimensional structure particularly excellent.

In the apparatus for producing a three-dimensional structure according to the aspect of the invention, it is preferable that the flattening unit is rotatably provided in the outer circumference of an ejecting unit of the dispenser.

In this manner, it is possible to more efficiently form layers (providing the composition and flattening the composition) and to make the productivity of the three-dimensional structure particularly excellent.

In the apparatus for producing a three-dimensional structure according to the aspect of the invention, it is preferable that the composition contains a solvent and the apparatus for producing a three-dimensional structure includes an atmosphere adjusting unit that adjusts an atmosphere of a space for which the composition is provided for an atmosphere containing a constituent component of the solvent.

In this manner, for example, it is possible to suppress unintentional volatilization of the solvent contained in the composition and to more effectively prevent generation of unintentional unevenness in thickness of a layer to be formed due to an extreme decrease or the like of the fluidity of the composition before a layer having a predetermined thickness is formed.

In the aspect of the invention, it is preferable that the apparatus for producing a three-dimensional structure further includes a binding solution providing unit that provides a binding solution used for bonding the grains to each other.

In this manner, it is possible to easily and reliably make the mechanical strength of the three-dimensional structure excellent.

In the apparatus for producing a three-dimensional structure according to the aspect of the invention, it is preferable that the binding solution contains a UV curable resin and the apparatus for producing a three-dimensional structure includes a UV irradiation unit.

In this manner, it is possible to make the mechanical strength of the three-dimensional structure to be produced particularly excellent.

According to another aspect of the invention, there is provided a method of producing a three-dimensional structure which produces a three-dimensional structure using the apparatus for producing a three-dimensional structure.

In this manner, it is possible to provide a method of producing a three-dimensional structure capable of efficiently producing a three-dimensional structure while reducing an amount of the composition to be used for producing a three-dimensional structure.

According to still another aspect of the invention, there is provided a method of producing a three-dimensional structure in which forming of layers performs for several times using a paste-like composition containing grains, in which the forming of the layers are performed by directly supplying the composition to a forming area on a stage using a dispenser.

In this manner, it is possible to provide a method of producing a three-dimensional structure capable of efficiently producing a three-dimensional structure while reducing an amount of the composition to be used for producing a three-dimensional structure.

In the method of producing a three-dimensional structure according to the aspect of the invention, it is preferable that the forming of the layers is performed by flattening the composition using a flattening unit after the composition is provided for the forming area.

In this manner, it is possible to more effectively prevent generation of unintentional unevenness in the three-dimensional structure to be produced and to make the dimensional precision of the three-dimensional structure particularly excellent.

In the aspect of the invention, it is preferable that the method of producing a three-dimensional structure includes providing a binding solution for the layer to bond the grains to each other.

In this manner, it is possible to finally form a bonding unit having a desirable shape by rigidly bonding the grains constituting the layer to each other.

In the method of producing a three-dimensional structure according to the aspect of the invention, it is preferable that the composition contains a solvent and the forming of the layer is performed in an atmosphere in which a constituent component of the solvent is included.

In this manner, for example, it is possible to suppress unintentional volatilization of the solvent contained in the composition and to more effective prevent generation of unintentional unevenness in thickness of a layer to be formed due to an extreme decrease or the like of the fluidity of the composition before a layer having a predetermined thickness is formed.

According to still another aspect of the invention, there is provided a three-dimensional structure which is produced using the apparatus for producing a three-dimensional structure of the invention.

In this manner, it is possible to provide a three-dimensional structure with a low price.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
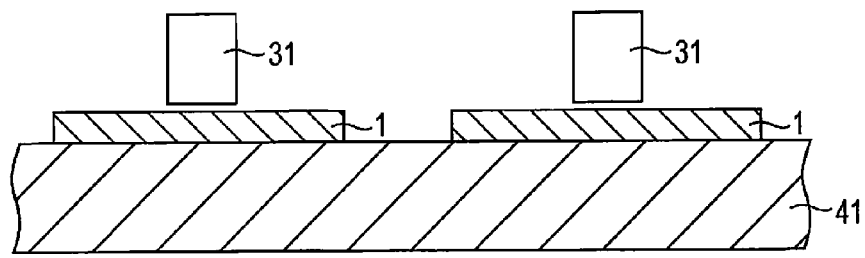
FIGS. 1A to 1D are cross-sectional views schematically illustrating respective processes of a method of producing a three-dimensional structure according to a preferred embodiment of the invention.
Figure 1B:
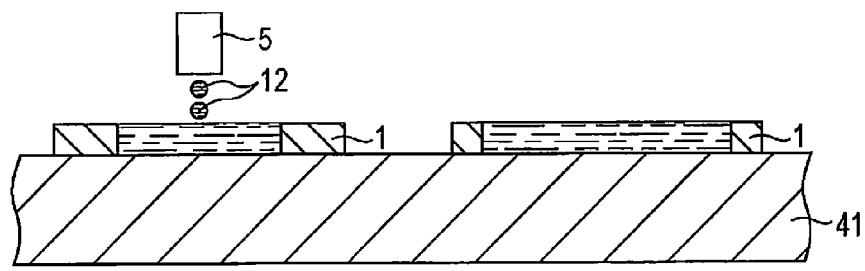
Figure 1C:
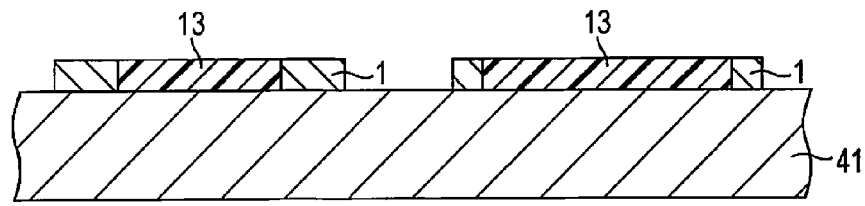

Hereinafter, preferred embodiments of the invention will be described in detail with reference to the accompanying drawings.

Method of Producing Three-Dimensional Structure

First, a method of producing a three-dimensional structure of the invention will be described.

FIGS. 1A to 2D are cross-sectional views schematically illustrating respective processes of a method of producing a three-dimensional structure according to a preferred embodiment of the invention.

As illustrated in FIGS. 1A to 2D, the production method of the present embodiment includes a layer forming process (FIGS. 1A and 1D) of forming a layer 1 having a predetermined thickness using a paste-like composition 11 containing grains 111; a binding solution providing process (FIGS. 1B and 2A) of providing a binding solution 12 for the layer 1 according to an ink jet method; a curing process (bonding process) (FIGS. 1C and 2B) of forming a curing unit (bonding unit) 13 in the layer 1 by curing a binder 121 contained in the binding solution 12 provided for the layer 1 and by bonding the grains 111 to each other; and an unbonded particle removing process (FIG. 2D) of removing unbonded particles from the grains 111 constituting each layer 1 with the binder 121 after these processes are sequentially and repeatedly performed.

In addition, during the layer forming process, the composition 11 is directly provided for a forming area on a stage 41 by a dispenser 31. That is, the composition 11 is supplied to the surface of the stage by the dispenser 31 during the layer forming process performed for the first time and the composition 11 is supplied to the surface (upper surface) of the layer 1 formed earlier by the dispenser 31 during the layer forming process performed for the second or subsequent time.

In this manner, it is possible to supply the composition 11 with an amount corresponding to the size of a three-dimensional structure 10 to be produced to a forming area by directly supplying the composition 11 to the forming area on the stage 41 using the dispenser 31 and to suppress generation of the wasteful composition 11 and reduce the amount of the composition to be used, which is used for producing the three-dimensional structure 10.

In addition, in the invention, the forming area means an area capable of forming a layer and a bonding unit and, specifically, means an area overlapped with the stage when the apparatus for producing a three-dimensional structure is seen in a plan view.

Hereinafter, respective processes will be described.

Layer Forming Process

During the layer forming process, the layer 1 having a predetermined thickness is formed (FIGS. 1A and 1D) using the paste-like composition (composition for three-dimensional forming) 11 containing the grains 111.

It is possible to increase the fluidity of the composition 11 and to improve workability at the time of forming the layer 1 using a paste-like composition as the composition 11. Further, it is possible to prevent unintentional scattering of powder (grains 111) at the time of forming the layer 1.

Moreover, since the paste-like composition 11 has generally thixotropic properties, the composition 11 has sufficient fluidity at the time of forming the layer 1 and has excellent stability in shape after the layer is formed. Accordingly, when the paste-like composition 11 is used, this is advantageous from a viewpoint of keeping a balance between the productivity of the three-dimensional structure 10 and the dimensional precision of the three-dimensional structure 10 to be obtained.

In addition, in the invention, the paste-like composition means that a composition contains a component in a liquid form during the layer forming process and, for example, paste-like compositions includes a composition containing a solvent component and a composition containing a component which is in a solid form at room temperature, but is melted by being heated during the layer forming process.

Further, the composition 11 will be described below.

Figure 1D:
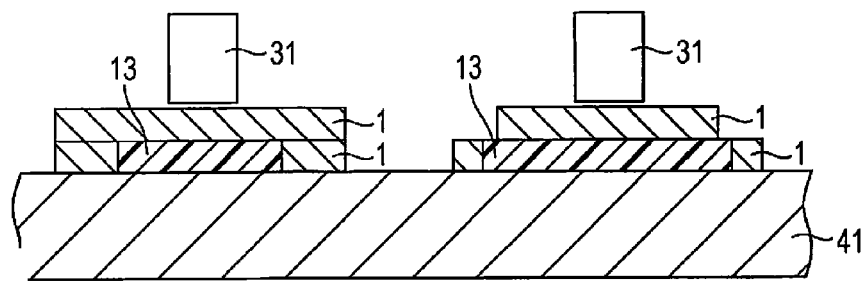
Figure 2A:
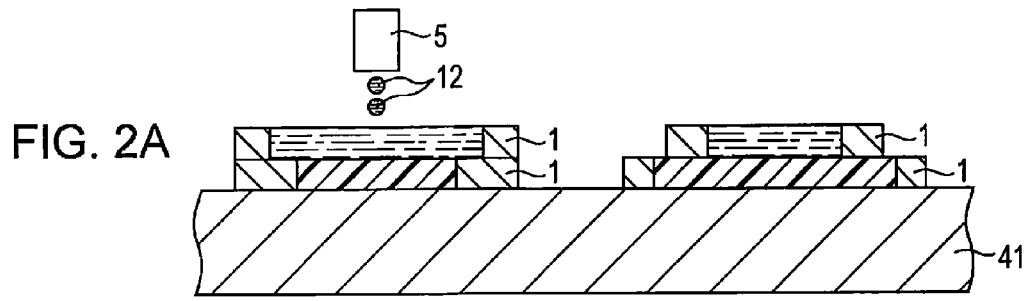
FIGS. 2A to 2D are cross-sectional views schematically illustrating respective processes of a method of producing a three-dimensional structure according to a preferred embodiment of the invention.
Figure 2B:
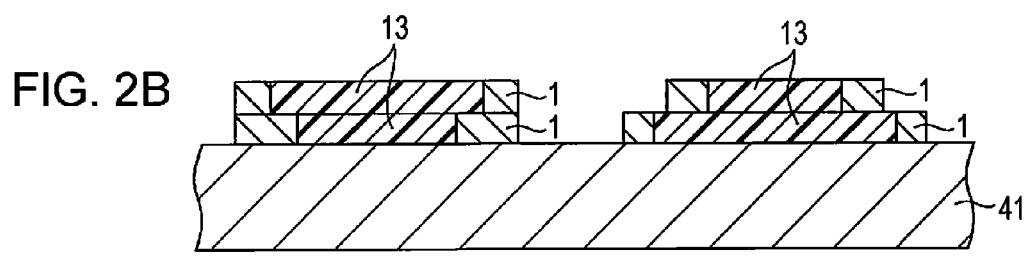
Figure 2C:
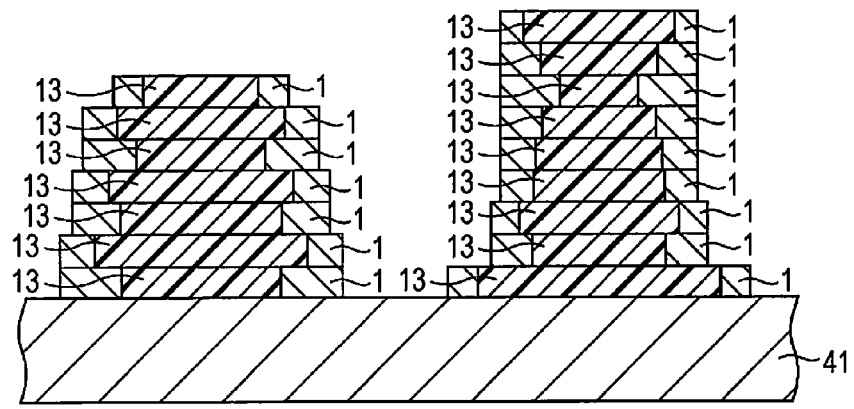
Figure 2D:
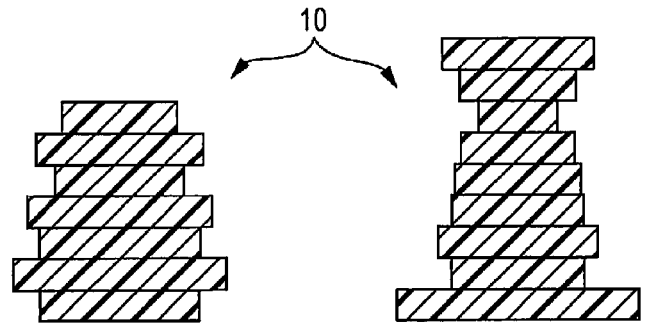

In addition, during this process, the composition 11 is directly provided for the forming area on the stage 41 by the dispenser 31. That is, the composition 11 is supplied to the surface of the stage by the dispenser 31 during the layer forming process performed for the first time (FIG. 1A) and the composition 11 is supplied to the surface (upper surface) of the layer 1 formed earlier by the dispenser 31 during the layer forming process performed for the second or subsequent time (FIG. 1D).

In this manner, it is possible to supply the composition 11 with an amount corresponding to the size of a three-dimensional structure 10 to be produced to the forming area by directly supplying the composition 11 to the forming area on the stage 41 using the dispenser 31 and to suppress generation of the wasteful composition 11 and reduce the amount of the composition to be used, which is used for producing the three-dimensional structure 10.

Further, since the paste-like composition 11 has excellent fluidity compared to powder having no liquid component, it is possible to suitably form the layer 1 with a desired thickness, in which unintentional unevenness in the thickness is suppressed.

Further, in the configuration illustrated in the figure, plural dispensers 31 are used.

In this manner, for example, it is possible to form plural independent layers 1 in regions with forming areas different from one another by performing a single process and to suitably and concurrently produce plural three-dimensional structures 10 using a single apparatus while reducing the amount of the composition 11 to be used.

In addition, for example, it is possible to suppress an increase in the amount of the composition 11 supplied by each dispenser 31 using plural dispensers 31 even when the layer 1 to be formed has a large cross-sectional area and to efficiently form the layer 1 in a short period of time. Therefore, it is possible to produce the three-dimensional structure 10 even in such a state with excellent productivity.

During this process, the surface of the layer 1 is flattened using a flattening unit (in FIGS. 1A to 2D, not illustrated).

In this manner, it is possible to more effectively prevent the generation of unintentional unevenness in the three-dimensional structure 10 to be produced and to make the dimensional precision of the three-dimensional structure 10 particularly excellent.

In a case where the composition 11 contains a solvent, it is preferable that this process is performed in an atmosphere in which a constituent component of the solvent is included.

In this manner, for example, it is possible to suppress unintentional volatilization of the solvent contained in the composition 11 and to more effective prevent the generation of unintentional unevenness in the thickness of the layer 1 to be formed due to an extreme decrease or the like of the fluidity of the composition 11 before the layer 1 having a predetermined thickness is formed.

Moreover, in a case where a solvent contains plural components, plural components constituting the solvent may be contained or only one kind among the components constituting the solvent may be contained in the adjusted atmosphere during this process.

In the atmosphere, it is preferable that at least main components of the constituent components of the solvent are contained. In this manner, the above-described effects are more reliably exhibited.

Further, in the atmosphere, it is preferable that a component, among the constituent components of the solvent, whose boiling point is the lowest is contained. In this manner, the above-described effects can be more markedly exhibited.

Moreover, the component, among the constituent components of the solvent contained in the atmosphere, whose boiling point is the lowest has preferably a boiling point of 80° C. or lower and more preferably 70° C. or lower. In this manner, the above-described effects can be more markedly exhibited.

In this process, the composition 11 may be heated. In this manner, for example, in a case where the composition 11 includes a melting component, it is possible to suitably make the composition 11 into a more paste-like composition.

The viscosity (value measured using an E-type viscometer (VISCONIC ELD, manufactured by Tokyo Keiki Co., Ltd.)) of the composition 11 in this process is preferably in the range of 7000 mPa·s to 60000 mPa·s and more preferably in the range of 10000 mPa·s to 50000 mPa·s.

In this manner, it is possible to more effectively prevent the generation of unintentional unevenness in the film thickness of the layer 1 to be formed.

The thickness of the layer 1 to be formed in this process, which is not particularly limited, is preferably in the range of 30 μm to 500 μm and more preferably in the range of 70 μm to 150 μm.

In this manner, it is possible to make the productivity of the three-dimensional structure 10 sufficiently excellent, more effectively prevent the generation of unintentional unevenness in the three-dimensional structure 10 to be produced, and make the dimensional precision of the three-dimensional structure 10 particularly excellent.

In addition, the layer 1 to be formed in this process may have a uniform thickness in each region or may have a region whose thickness is different.

For example, in the configuration illustrated in the figure, plural independent layers 1 are formed during the layer forming process performed for the first time, but the thicknesses of respective layers 1 may be different from one another. In this manner, for example, plural three-dimensional structures 10 with conditions different from one another can be concurrently produced using a single apparatus.

In addition, the thicknesses of the layers 1 (plural layers 1 to be laminated to one another) to be formed during the layer forming process performed several times may be the same as or different from one another.

Binding Solution Providing Process

The binding solution 12 used for bonding the grains 111 constituting the layer 1 is provided for the layer 1 (FIGS. 1B and 2A) according to an ink jet method after the layer 1 is formed during the layer forming process.

In this process, the binding solution 12 is selectively provided for only a region corresponding to an entity portion (region with an entity) of the three-dimensional structure 10 in the layer 1.

In this manner, it is possible to finally form the curing unit (bonding unit) 13 having a desired shape by rigidly bonding the grains 111 to each other constituting the layer 1. Moreover, it is possible to make the mechanical strength of the three-dimensional structure 10 which is finally obtained excellent.

In addition, since the composition is partially provided for the forming area in the layer 1 for which the binding solution 12 is provided in this process for the purpose of reducing the amount of the composition 11 to be used in the above-described layer forming process, the area of the region in the layer 1 for which the binding solution 12 is not provided in this process can be set to be relatively small.

In this process, since the binding solution 12 is provided according to an ink jet method, it is possible to provide the binding solution 12 with excellent reproducibility even when the providing pattern of the binding solution 12 has a minute shape. As a result, it is possible to particularly improve the dimensional precision of the three-dimensional structure 10 which is finally obtained.

Moreover, the binding solution 12 will be described below in detail.

Curing Process (Bonding Process)

The curing unit (bonding unit) 13 is formed (FIGS. 1C and 2B) by curing the binder 121 contained in the binding solution 12 provided for the layer 1 after the binding solution 12 is provided for the layer 1 in the binding solution providing process. In this manner, it is possible to make the bonding strength between the binder 121 and the grains 111 particularly excellent and thus it is possible to make the mechanical strength of the three-dimensional structure 10 which is finally obtained particularly excellent.

This process varies depending on the kind of binder 121 used. For example, the process can be performed by heating in a case where the binder 121 is a thermosetting resin and the process can be performed by irradiation with corresponding light in a case where the binder 121 is a light curable resin (for example, the process can be performed by irradiation with UV rays in a case where the binder 121 is a UV curable resin).

In addition, the binding solution providing process and the curing process may be concurrently performed. That is, a curing reaction may be sequentially proceeded from the region for which the binding solution 12 is provided before all patterns of one entire layer 1 are formed.

Further, for example, in a case where the binder 121 is not a curable component, this process can be omitted. In this case, the above-described binding solution providing process serves as the bonding process.

Unbonded Particle Removing Process

Further, as a post-treatment process, an unbonded particle removing process (FIG. 2D) of removing unbonded particles from grains 111 constituting each layer 1 which are not bonded together with the binder 121 is performed after a series of processes described above are repeatedly performed. In this manner, the three-dimensional structure 10 is extracted.

Specific examples of the method of this process include a method of brushing unbonded particles using a brush or the like; a method of removing unbonded particles through suction; a method of blowing gas such as air thereto; a method of providing a liquid such as water (for example, a method of immersing a laminate obtained in the above-described manner in a liquid or a method of blowing a liquid); and a method of providing vibration such as ultrasonic vibration thereto. Further, these methods can be used in a combination of two or more kinds thereof selected from these. More specifically, the method of immersing a laminate in a liquid such as water or a method of providing ultrasonic vibration in a state in which a laminate is immersed in a liquid such as water can be performed after gas such as air is blown thereto. Among these, it is preferable that a method of providing a liquid including water (particularly, a method of immersing a laminate in a liquid containing water) for a laminate obtained in the above-described manner is employed.

In the description above, the description is made that the bonding unit is formed using the binding solution. However, in the production method of the invention, the bonding unit may be formed using any method or the bonding unit may be formed by applying energy rays thereto and fusing (sintering and bonding) the grains 111.

According to the production method of the invention described above, it is possible to reduce the amount of the composition to be used, which is used for producing a three-dimensional structure, and to efficiently produce the three-dimensional structure.

Apparatus for Producing Three-Dimensional Structure

Next, the apparatus for producing a three-dimensional structure of the invention will be described.

Figure 3:
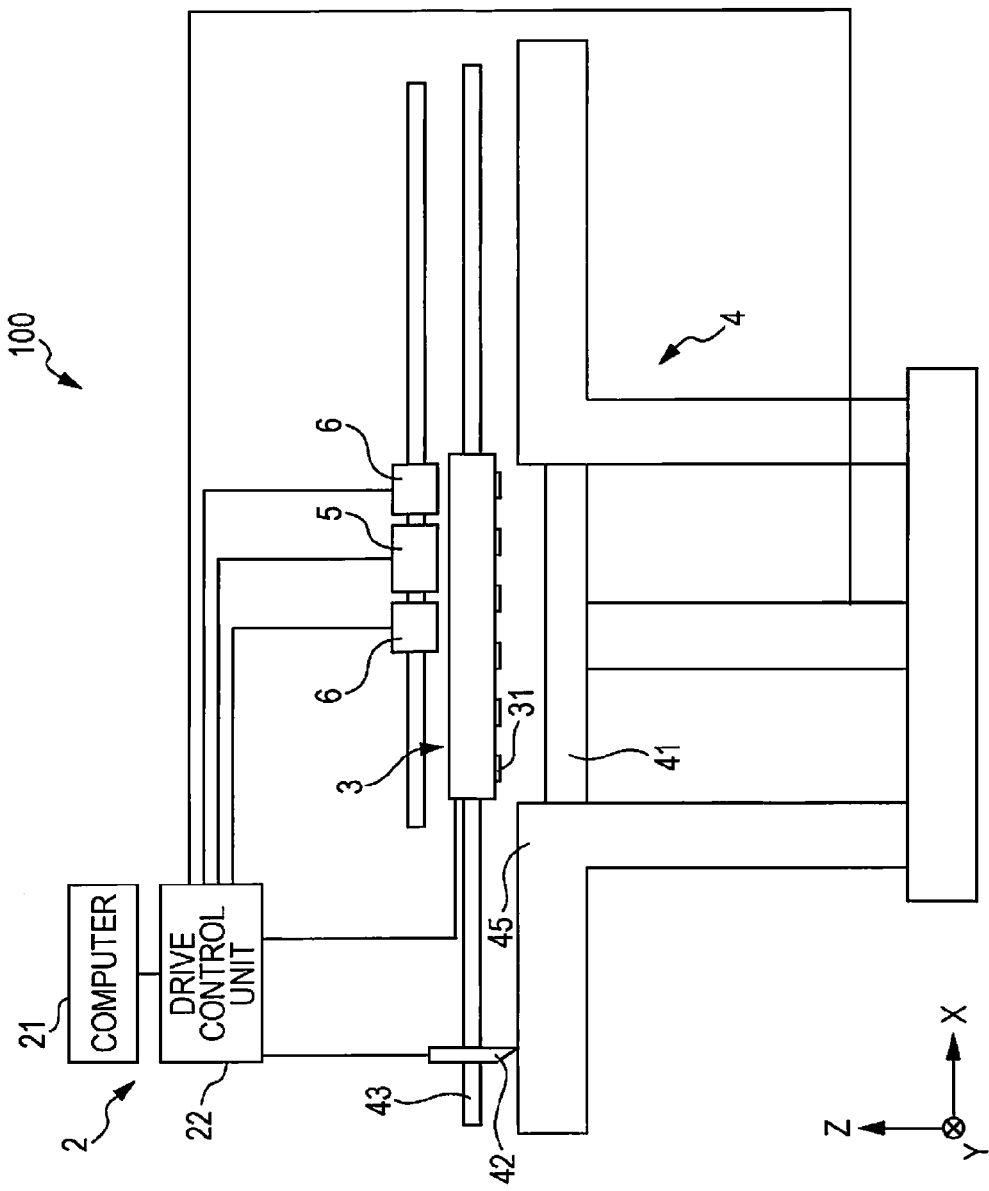
FIG. 3 is a cross-sectional view schematically illustrating an apparatus for producing a three-dimensional structure according to a first embodiment of the invention.
Figure 4:
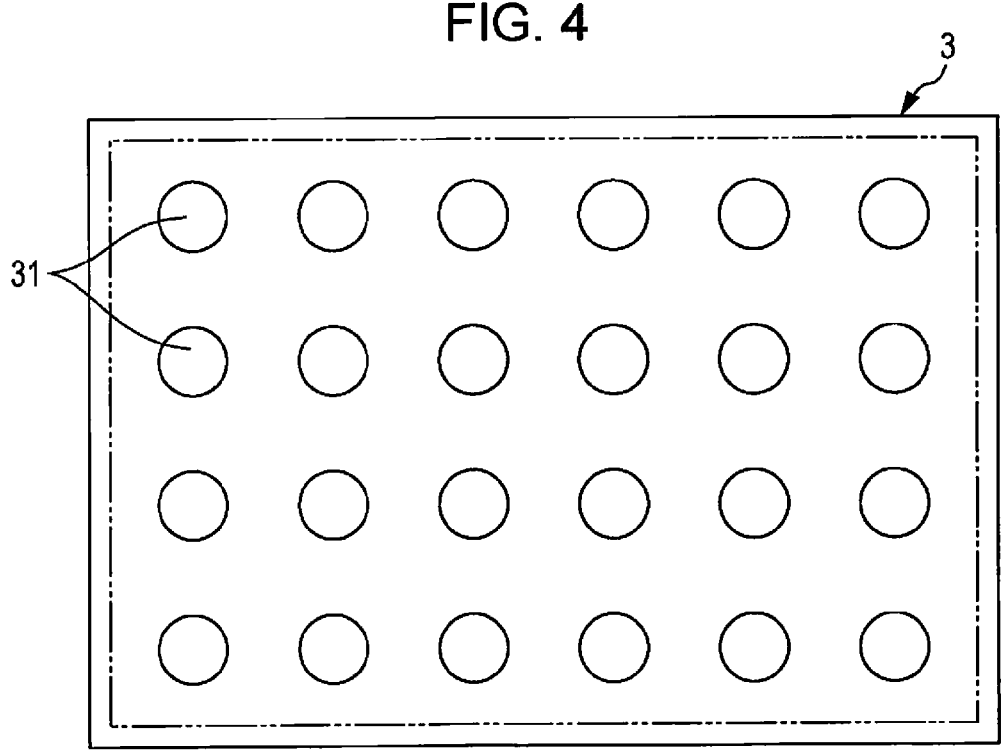
FIG. 4 is a view (view in which a dispenser is observed from a stage side) illustrating an example of arrangement of a dispenser included in the apparatus for producing a three-dimensional structure of the invention.
Figure 5:
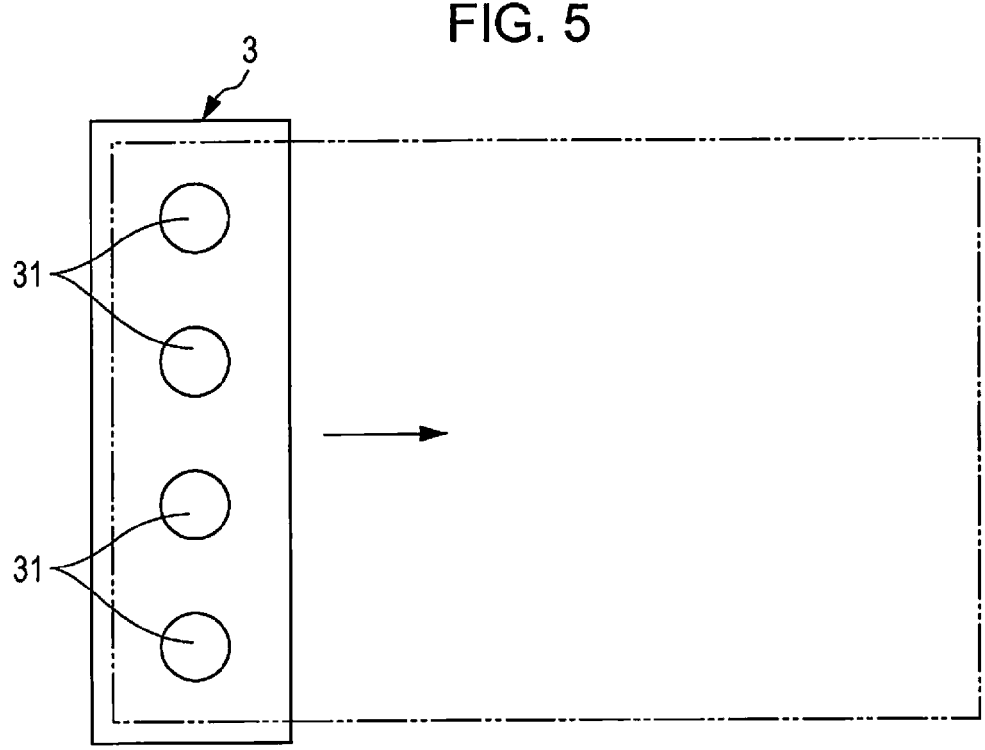
FIG. 5 is a view (view in which the dispenser is observed from the stage side) illustrating an example of arrangement of the dispenser included in the apparatus for producing a three-dimensional structure of the invention and illustrating a movement direction of the dispenser relative to a stage.
Figure 6:
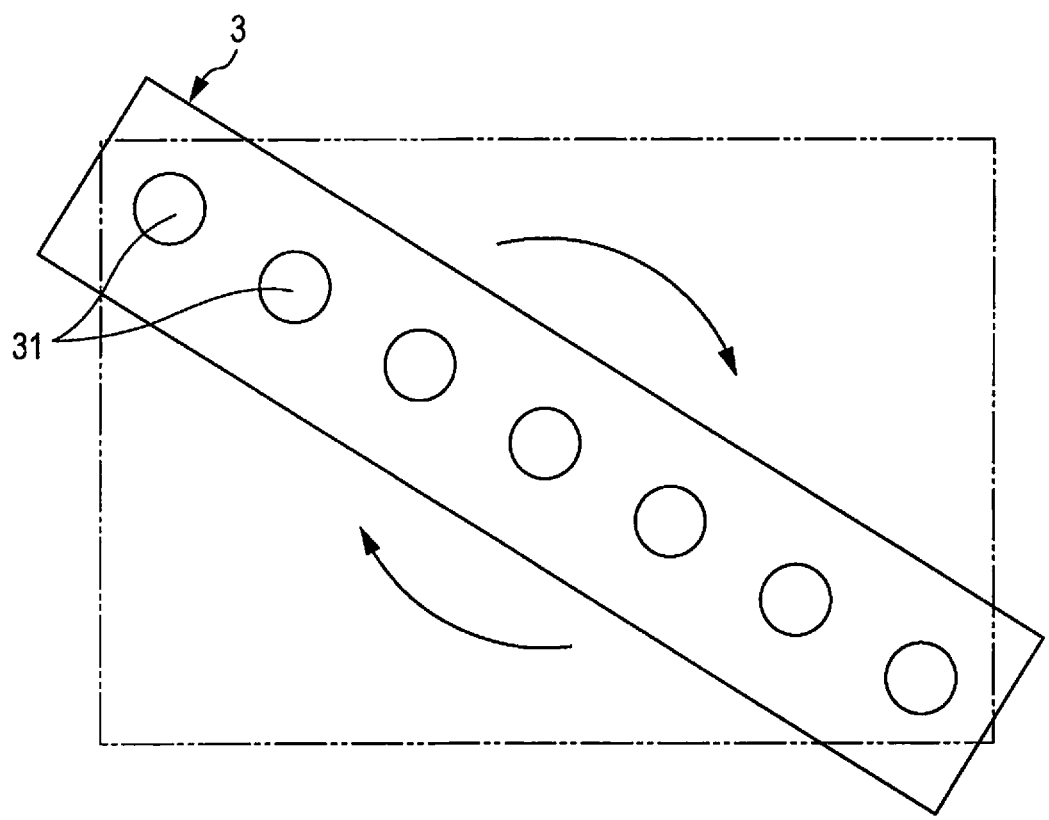
FIG. 6 is a view (view in which the dispenser is observed from the stage side) illustrating an example of arrangement of the dispenser included in the apparatus for producing a three-dimensional structure of the invention and illustrating the movement direction of the dispenser relative to the stage.

FIG. 3 is a cross-sectional view schematically illustrating an apparatus for producing a three-dimensional structure according to a first embodiment of the invention. FIG. 4 is a view (view in which a dispenser is observed from a stage side) illustrating an example of arrangement of a dispenser included in the apparatus for producing a three-dimensional structure of the invention. FIG. 5 is a view (view in which the dispenser is observed from the stage side) illustrating an example of arrangement of the dispenser included in the apparatus for producing a three-dimensional structure of the invention and illustrating a movement direction of the dispenser relative to a stage. FIG. 6 is a view (view in which the dispenser is observed from the stage side) illustrating an example of arrangement of the dispenser included in the apparatus for producing a three-dimensional structure of the invention and illustrating the movement direction of the dispenser relative to the stage. In FIGS. 4 to 6, the range corresponding to the forming area is indicated by a double chain line.

An apparatus 100 for producing a three-dimensional structure produces a three-dimensional structure 10 by repeatedly forming layers 1 and laminating the layers 1 to each other using the paste-like composition (composition for three-dimensional forming) 11 containing grains 111.

Figure 7:
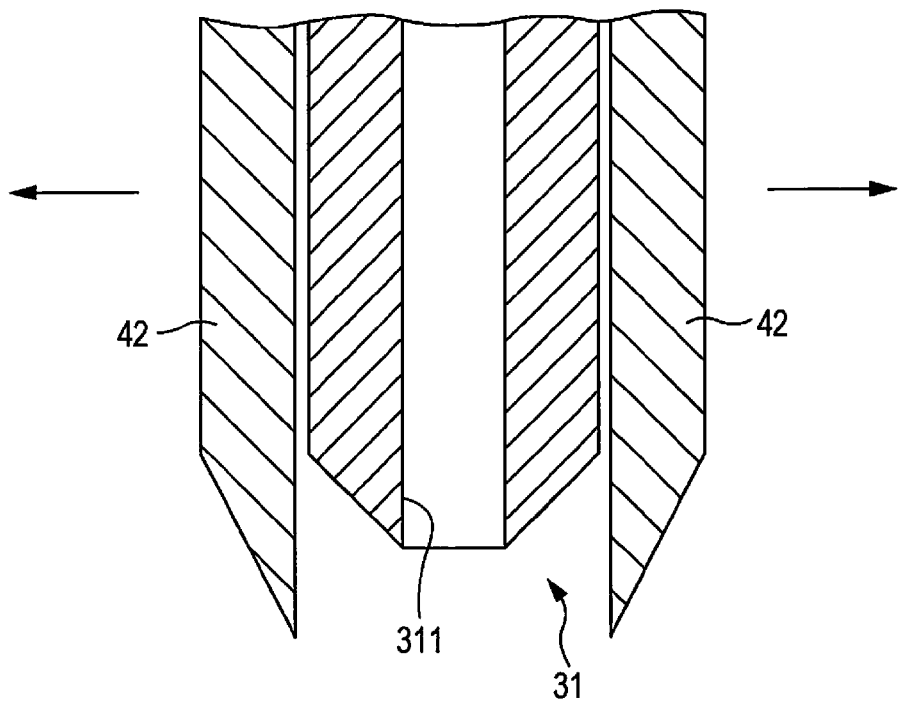
FIG. 7 is a cross-sectional view schematically illustrating a positional relationship between a dispenser and a flattening unit included in an apparatus for producing a three-dimensional structure according to a second embodiment of the invention.
Figure 8:
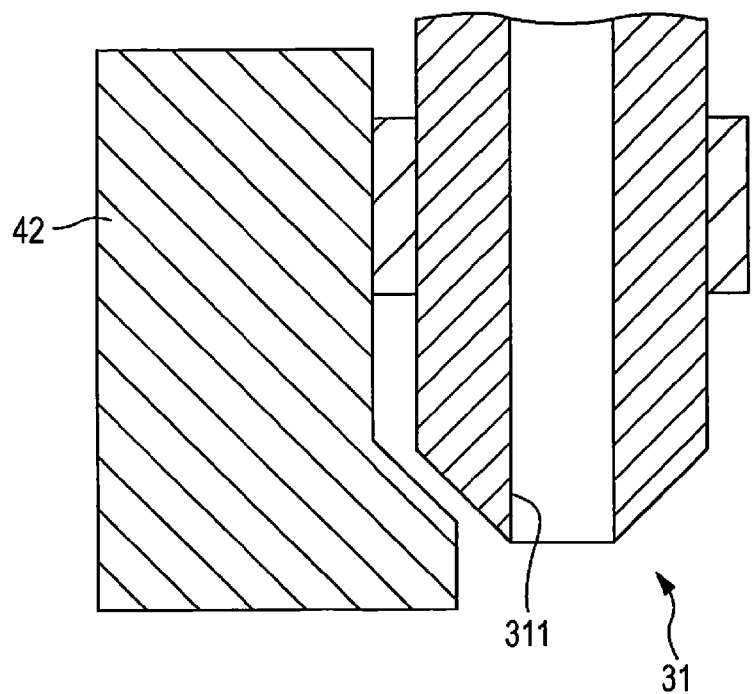
FIG. 8 is a cross-sectional view schematically illustrating a positional relationship between a dispenser and a flattening unit included in an apparatus for producing a three-dimensional structure according to a third embodiment of the invention.

As illustrated in FIG. 3, the apparatus 100 for producing a three-dimensional structure includes a control unit 2; a dispenser unit (dispenser array) 3 having plural dispensers 31 that eject the paste-like composition 11 containing the grains 111; a layer forming unit 4 that forms the layer 1 using the composition 11 supplied from the dispenser 31; a binding solution ejecting unit (binding solution providing unit) 5 that ejects the binding solution 12 to the layer 1; and an energy ray irradiation unit (curing unit) 6 that irradiates with energy rays in order to cure the binding solution 12 (the same applies to the apparatus 100 for producing a three-dimensional structure illustrated in FIGS. 7 and 8).

The control unit 2 (not illustrated) includes a computer 21 and a drive control unit 22.

The computer 21 is a general tabletop computer including a CPU or a memory in the inside thereof. The computer 21 makes the shape of the three-dimensional structure 10 into data as model data and outputs cross-section data (slice data) obtained by slicing the data into a thin cross-section body formed of several layers in parallel to the drive control unit 22.

The drive control unit 22 functions as a control unit that drives each of the dispenser unit 3, the layer forming unit 4, the binding solution ejecting unit 5, and the energy ray irradiation unit 6. Specifically, the drive control unit controls an ejecting pattern or an ejecting amount of the binding solution 12 using the binding solution ejecting unit 5; an amount of the composition 11 supplied from the dispenser 31; the supply region; and a descent amount of the stage 41.

The dispenser unit 3 is moved according to an instruction from the drive control unit 22 and supplies a predetermined amount of composition 11 to a predetermined region in the forming area.

In the configuration illustrated in the figure, the apparatus 100 for producing a three-dimensional structure includes the dispenser unit 3 including plural dispensers 31.

In this manner, when plural dispenser units 31 are included, it is possible to form plural independent layers 1 in regions with forming areas different from one another by performing a single process and to suitably and concurrently produce plural three-dimensional structures 10 while reducing the amount of the composition 11 to be used.

In addition, for example, when plural dispensers 31 are included, it is possible to suppress an increase in the amount of the composition 11 supplied by each dispenser 31 even when the layer 1 to be formed has a large cross-sectional area and to efficiently form the layer 1 in a short period of time. Therefore, it is possible to produce the three-dimensional structure 10 even in such a state with excellent productivity.

Ejecting conditions (the ejecting amount, the ejecting range, the ejecting speed, and the like) of the composition 11 from each dispenser 31 are controlled independently from each other. Further, conditions (for example, the composition, the temperature, and the like) of the composition 11 to be ejected from each dispenser 31 may be the same as or different from one another.

In this manner, by adjusting the ejecting conditions or the like of the composition 11 to be ejected from each dispenser 31, for example, it is possible to make the thicknesses of the layers 1 to be formed different from one another in plural dispensers 31. In this manner, for example, it is possible to concurrently produce plural three-dimensional structures 10 whose layers 1 have thicknesses different from one another.

In addition, when the plural dispensers 31 are made into units as the dispenser unit 3, for example, the maintenance or the like of the apparatus 100 for producing a three-dimensional structure becomes easy.

The heights of the plural dispensers 31 constituting the dispenser unit 3 can be adjusted independently from one another. In this manner, it is possible to suitably form the layer 1 even in a case where the thicknesses of the layers 1 formed by each dispenser 31 are different from one another. As a result, it is possible to suitably and concurrently produce plural three-dimensional structures 10 whose layers 1 have thicknesses different from one another.

The area of a region in which each dispenser 31 forms the layer 1, which is not particularly limited, is in the range of 3 $cm^2$ to 50 $cm^2$ and more preferably in the range of 5 $cm^2$ to 30 $cm^2$.

Next, the arrangement of plural dispensers 31 (arrangement of the dispensers 31 in the dispenser unit 3) included in the apparatus 100 for producing a three-dimensional structure will be described.

In the configuration illustrated in FIG. 4, the plural dispensers 31 are regularly arranged in a two-dimensional direction (in a lattice shape (in a square lattice shape)). In this manner, the dispenser unit 3 may not be moved at the time of providing the composition 11, or the movement amount of the dispenser unit 3 can be suppressed to be small even in a case where the dispenser unit 3 is moved. Therefore, it is possible to efficiently provide the composition 11 in a short period of time and to make the productivity of the three-dimensional structure 10 particularly excellent.

In addition, in the configuration illustrated in FIG. 5, the plural dispensers 31 are arranged in the one-dimensional direction (Y direction) at same intervals and moves (scans) in a direction (X direction) perpendicular to the arrangement direction (extending direction of the dispenser unit 3).

In this manner, even in a case where the area of the stage 41 is relatively large, it is possible to effectively prevent the total length of a path of the composition 11 included in the apparatus 100 for producing a three-dimensional structure from becoming longer and to suitably supply the composition 11 to the entire forming area.

Further, in the configuration illustrated in FIG. 6, the plural dispensers 31 are arranged in a one-dimensional direction at the same intervals similar to the configuration illustrated in FIG. 5 and are provided such that the dispenser unit 3 rotates using a normal direction (Z direction) of the stage as an axis.

In this manner, it is possible to uniformly supply the composition 11 toward a frame 45 surrounding the stage 41 by being rotated and to more uniformly form the layer 1.

The layer forming unit 4 includes a squeegee (flattening unit) 42 that forms the layer 1 while flattening the composition 11 supplied from the plural dispensers 31 constituting the dispenser unit 3; a guide rail 43 that regulates the operation of the squeegee 42; and the stage 41 that supports the formed layer 1; and the frame 45 that surrounds the stage 41.

The stage 41 sequentially descends by a predetermined amount according to an instruction from the drive control unit 22 when a new layer 1 is formed on the layer 1 formed earlier. The thickness of the layer 1 which is newly formed is prescribed by the descent amount or the like of the stage 41.

Further, as illustrated in FIG. 3, since the number of members to be moved for adjustment of the thickness of the layer 1 can be reduced at the time of forming a new layer 1 when the stage 41 is movably provided in a Z direction (vertical direction), it is possible to make the configuration of the apparatus 100 for producing a three-dimensional structure simpler.

The stage 41 has a flat surface (region for which the composition 11 is provided). In this manner, it is possible to easily and reliably form the layer 1 whose thickness is highly uniform.

It is preferable that the stage 41 is formed of a material with high strength. As the constituent material of the stage 41, for example, various metal materials such as stainless steel or the like can be exemplified.

In addition, the surface (region for which the composition 11 is provided) of the stage 41 may be subjected to a surface treatment. In this manner, it is possible to effectively prevent the constituent material of the composition 11 or the constituent material of the binding solution 12 from being adhered to the stage 41, to make the durability of the stage 41 particularly excellent, and to achieve stable production of the three-dimensional structure 10 for a longer period of time. As the material used in the surface treatment applied to the surface of the stage 41, for example, a fluorine resin such as polytetrafluoroethylene can be exemplified.

The squeegee (flattening unit) 42 has a function of flattening the composition 11 supplied by the dispenser 31.

When such a squeegee 42 is included, it is possible to more effectively prevent the generation or the like of unintentional unevenness in the three-dimensional structure 10 to be produced and to make the dimensional precision of the three-dimensional structure 10 particularly excellent.

It is preferable that the dispenser 31 and the squeegee (flattening unit) 42 can be operated independently from each other.

In this manner, for example, after the time for suitable wet-spreading of the composition 11 has passed, it is possible for the squeegee (flattening unit) 42 to perform flattening and to more suitably control the shape of the layer 1 to be formed. Such an effect is more markedly exhibited in a case where the composition 11 with relatively high viscosity as described below is used.

The squeegee 42 has a longitudinal shape extending in the Y direction and includes a blade having a shape of a blade whose tip in the lower portion is pointed.

The length of the blade in the Y direction is greater than or equal to the width (length in the Y direction) of the forming area.

In addition, the apparatus 100 for producing a three-dimensional structure may include a vibration mechanism (not illustrated) providing minute vibration for the blade such that the composition 11 can be smoothly diffused by the squeegee 42.

The binding solution providing unit (binding solution ejecting unit) 5 provides the binding solution 12 for the layer 1.

When the three-dimensional structure 10 includes the binding solution providing unit 5, it is possible to easily and reliably make the mechanical strength of the three-dimensional structure 10 excellent.

Particularly, in the present embodiment, the binding solution providing unit 5 is a binding solution ejecting unit that ejects the binding solution 12 according to an ink jet method.

In this manner, it is possible to provide the binding solution 12 in a fine pattern and to produce the three-dimensional structure 10 with particularly excellent productivity even in a case of the three-dimensional structure 10 having a minute structure.

As a droplet ejecting system (system of an ink jet method), a piezo system or a system of ejecting the binding solution 12 using bubbles generated by heating the binding solution 12 can be used, but a piezo system is preferable from a viewpoint of difficulty in changing the quality of a constituent component of the binding solution 12.

In the binding solution ejecting unit (binding solution providing unit) 5, the pattern to be formed in each layer 1 and the amount of the binding solution 12 provided for each unit of the layer 1 are controlled according to an instruction from the drive control unit 22. The ejecting pattern or the ejecting amount of the binding solution 12 with the binding solution ejecting unit (binding solution providing unit) 5 is determined based on the slice data.

The energy ray irradiation unit (curing unit) 6 irradiates with energy rays for curing the binding solution 12 provided for the layer 1.

The kind of energy rays applied by the energy ray irradiation unit 6 varies according to the constituent material of the binding solution 12, and examples thereof include UV rays, visible light, infrared rays, X-rays, g-rays, electron beams, and ion beams. Among these, it is preferable to use UV rays from a viewpoint of the cost and the productivity of the three-dimensional structure. In the description below, a case where the curing unit 6 is a UV ray irradiation unit that irradiates with UV rays will be mainly described.

In a case where the composition 11 described below contains a solvent, it is preferable that the apparatus 100 for producing a three-dimensional structure includes an atmosphere adjusting unit (not illustrated) that adjusts an atmosphere of a space (in a chamber) to which the composition 11 is supplied to an atmosphere containing a constituent component of the solvent.

In this manner, for example, it is possible to suppress unintentional volatilization of the solvent contained in the composition 11 and to more effective prevent the generation of unintentional unevenness in thickness of the layer 1 to be formed due to an extreme decrease or the like of the fluidity of the composition 11 before the layer 1 having a predetermined thickness is formed.

As the atmosphere adjusting unit, for example, a gas supply unit that supplies gas containing constituent components of the solvent, a spray unit that sprays constituent components of the solvent, or the like can be employed.

Next, an apparatus for producing a three-dimensional structure according to a second embodiment of the invention will be described.

FIG. 7 is a cross-sectional view schematically illustrating a positional relationship between a dispenser and a flattening unit included in the apparatus for producing a three-dimensional structure according to the second embodiment of the invention. In the description below, differences from the above-described embodiment will be mainly described and the redundant description will not be repeated.

In an apparatus 100 for producing a three-dimensional structure illustrated in FIG. 7, a dispenser 31 relatively moves in the in-plane direction of a stage 41 and supplies the composition 11 to the stage 41; and a squeegee (flattening unit) 42 is provided in the longitudinal direction of the relative movement direction of the dispenser 31.

With such a configuration, for example, when the dispenser 31 moves in both relative movement directions (the right direction and the left direction in the configuration illustrated in FIG. 7), since supplying the composition 11 using the dispenser 31 and the flattening using the squeegee (flattening unit) 42 can be concurrently performed, it is possible to make the productivity of the three-dimensional structure 10 particularly excellent. Further, when the squeegee (flattening unit) 42 is provided in the longitudinal direction of the relative movement direction of the dispenser 31, it is possible to suppress unintentional volatilization of the solvent contained in the composition 11 in a case where the composition 11 contains the solvent and to more effective prevent generation of unintentional unevenness in thickness of a layer 1 to be formed due to an extreme decrease or the like of the fluidity of the composition 11 before the layer 1 having a predetermined thickness is formed.

In a case where the apparatus 100 for producing a three-dimensional structure has the configuration illustrated in FIG. 7, it is preferable that the arrangement of the dispenser 31 and the relative movement direction between the dispenser 31 and the stage 41 are as illustrated in FIG. 5.

Next, an apparatus for producing a three-dimensional structure according to a third embodiment of the invention will be described.

FIG. 8 is a cross-sectional view schematically illustrating a positional relationship between a dispenser and a flattening unit included in the apparatus for producing a three-dimensional structure according to the third embodiment of the invention. In the description below, differences from the above-described embodiment will be mainly described and the redundant description will not be repeated.

In an apparatus 100 for producing a three-dimensional structure illustrated in FIG. 8, a squeegee (flattening unit) 42 is rotatably arranged in the outer circumference of an ejecting unit 311 of a dispenser 31 through a ring member 7 using a Z direction as an axis.

In such a configuration, since squeegees (flattening units) 42 are respectively provided in the vicinity of respective dispensers 31, it is possible to more effectively form a layer 1 (providing a composition 11 and flattening the composition 11) and to make the productivity of the three-dimensional structure 10 particularly excellent. Among the respective squeegees (flattening units) 42 provided in areas corresponding to the respective dispensers 31, only the squeegees corresponding to the dispensers 31 ejecting the composition 11 may be operated.

In a case where the apparatus 100 for producing a three-dimensional structure has the configuration illustrated in FIG. 8, it is preferable that the arrangement of the dispenser 31 and the relative movement direction between the dispenser 31 and the stage 41 are as illustrated in FIGS. 4 and 5.

Moreover, in the configuration illustrated in FIG. 8, the height of the dispenser 31 constituting the dispenser unit 3 can be adjusted such that the thickness of the layer 1 to be formed can be made different from one another with respect to plural dispensers 31.

In this manner, for example, it is possible to suitably and concurrently produce plural three-dimensional structures 10 whose layers 1 have different thicknesses from one another.

In the description above, the curing unit (bonding unit) is formed by the apparatus for producing a three-dimensional structure including the binding solution ejecting unit (binding solution providing unit) and the energy ray irradiation unit (curing unit), but the apparatus for producing a three-dimensional structure of the invention is not limited to an apparatus having such a structure as a unit that forms a bonding unit and may include an energy ray irradiation unit that irradiates with energy rays for fusing (sintering and conjugating) grains in place of the binding solution ejecting unit (binding solution providing unit) and the energy ray irradiation unit (curing unit).

In a case where the apparatus for producing a three-dimensional structure includes an energy ray irradiation unit that irradiates energy rays for fusing (sintering and bonding) grains, the energy ray irradiation unit whose pattern to be formed in each layer 1 (irradiation pattern of energy rays) and energy amount of energy rays to be applied to each portion of the layers 1 are controlled according to an instruction from the drive control unit 22. The irradiation pattern, the energy amount, and the like of the energy rays applied by the energy ray irradiation unit are determined based on slice data.

According to the apparatus for producing a three-dimensional structure of the invention described above, it is possible to reduce the amount of the composition to be used for producing a three-dimensional structure and to efficiently produce a three-dimensional structure.

Composition (Composition for Three-Dimensional Forming)

Next, the composition used for producing a three-dimensional structure (composition for three-dimensional forming) 11 of the invention will be described in detail.

Figure 9:
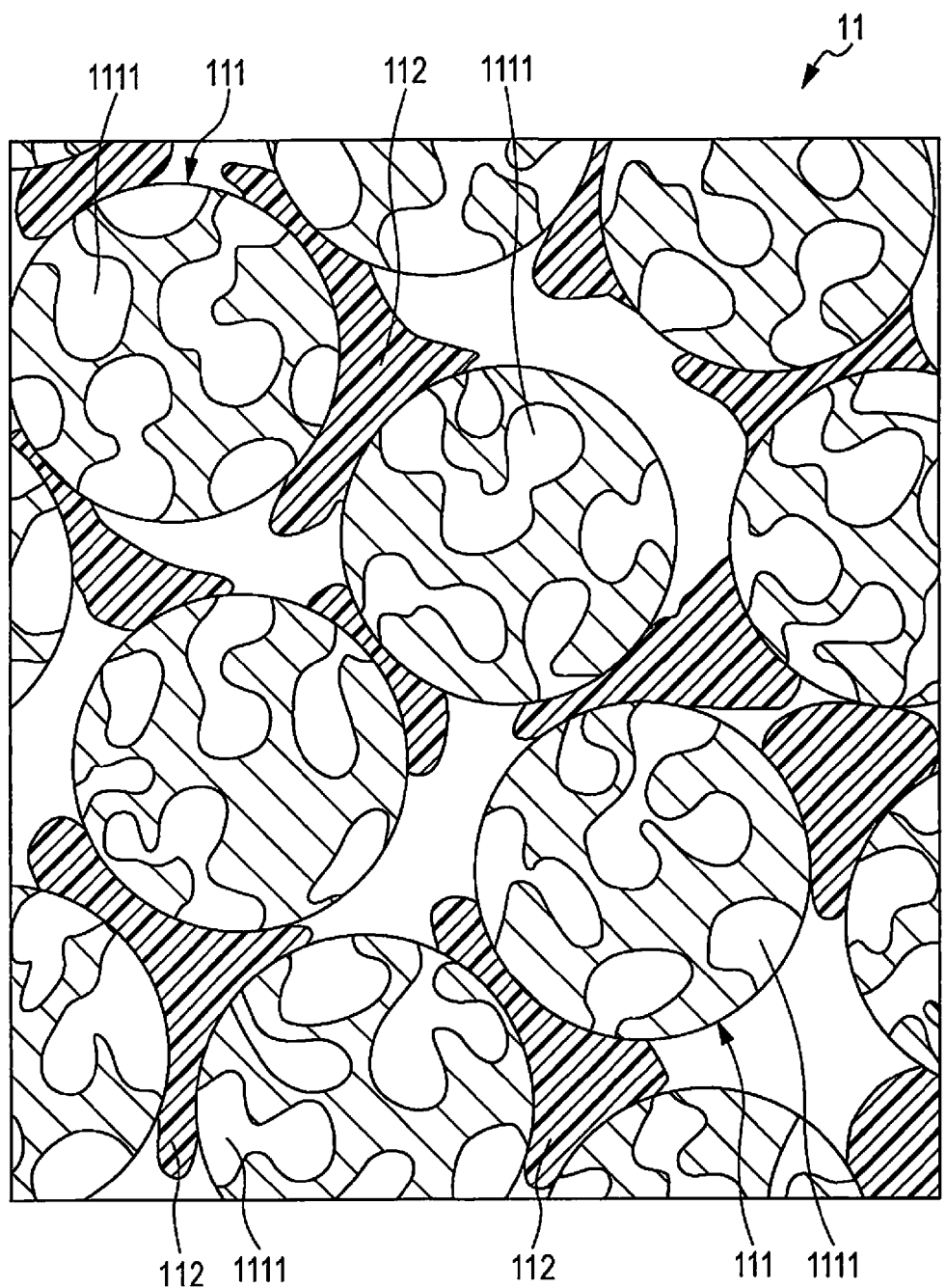
FIG. 9 is a cross-sectional view schematically illustrating a state in a layer (composition for three-dimensional forming) immediately before a binding solution providing process is performed.
Figure 10:
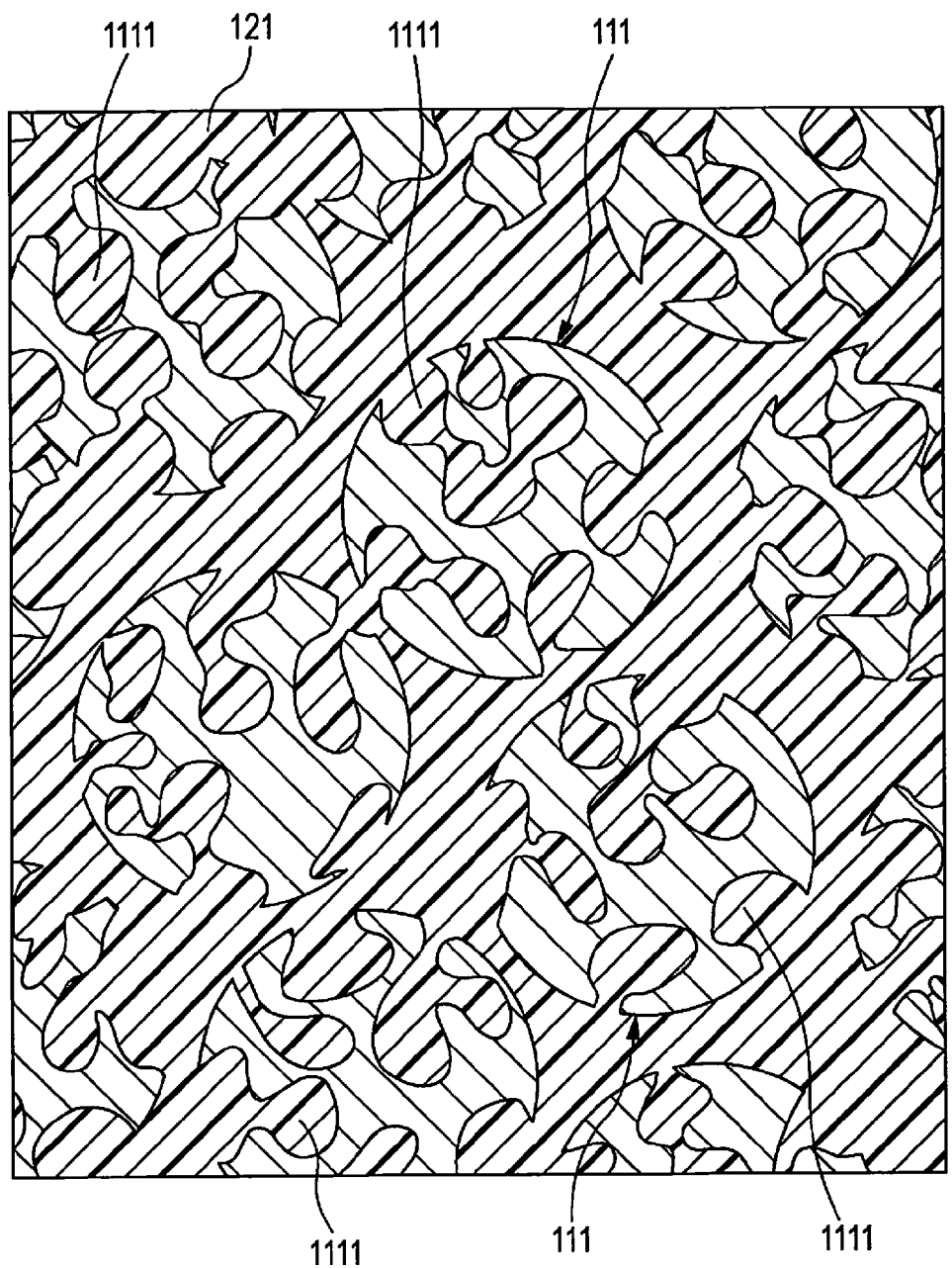
FIG. 10 is a cross-sectional view schematically illustrating a state in which the grains are bonded to each other with a hydrophobic binder.

FIG. 9 is a cross-sectional view schematically illustrating a state in a layer (composition for three-dimensional forming) immediately before a binding solution providing process is performed. FIG. 10 is a cross-sectional view schematically illustrating a state in which the grains are bonded to each other with a hydrophobic binder.

The composition (composition for three-dimensional forming) 11 includes at least powder for three-dimensional forming which contains plural grains 111 and has a shape of paste.

Powder for Three-Dimensional Forming (Grains 111)

It is preferable that the grains 111 constituting powder for three-dimensional forming are porous and are subjected to a hydrophobic treatment. With such a configuration, in a case where a binding solution 12 includes a hydrophobic binder 121, it is possible for the hydrophobic binder 121 to suitably infiltrate into pores 1111 and thus an anchor effect is exhibited when the three-dimensional structure 10 is produced. As a result, it is possible to make the bonding force (bonding force through the binder 121) among the grains 111 excellent, and accordingly, it is possible to suitably produce the three-dimensional structure 10 with excellent mechanical strength (see FIG. 10). Further, such powder for three-dimensional forming can be suitably reused. More specifically, since a water-soluble resin 112 described below is prevented from entering the pores 1111 when the grains 111 constituting the powder for three-dimensional forming is subjected to a hydrophobic treatment, the grains 111 in an area for which the binding solution 12 is not provided in the production of the three-dimensional structure 10 can be recovered with a small content ratio of impurities and with high purity by washing the grains 111 with water or the like. Therefore, it is possible to obtain the composition for three-dimensional forming controlled to have a desired composition by mixing the recovered powder for three-dimensional forming with the water-soluble resin 112 or the like again with a predetermined ratio. Further, it is possible to effectively prevent unintentional wet spreading of the binding solution 12 with the binder 121 constituting the binding solution 12 entering the pores 1111 of the grains 111. As a result, it is possible to further improve the dimensional precision of the three-dimensional structure 10 which is finally obtained.

Examples of the constituent material of the grains 111 constituting the powder for three-dimensional forming (mother particles to which a hydrophobic treatment is applied) include inorganic materials, organic materials, and complexes thereof.

Examples of the inorganic materials constituting the grains 111 include various metals or metal compounds. Examples of the metal compounds include various metal oxides such as silica, alumina, titanium oxide, zinc oxide, zirconium oxide, tin oxide, magnesium oxide, and potassium titanate; various metal hydroxides such as magnesium hydroxide, aluminum hydroxide, and calcium hydroxide; various metal nitrides such as silicon nitride, titanium nitride, and aluminum nitride; various metal carbides such as silicon carbide and titanium carbide; various metal sulfides such zinc sulfide; carbonate of various metals such as calcium carbonate and magnesium carbonate; sulfate of various metals such as calcium sulfate and magnesium sulfate; silicate of various metals such as calcium silicate and magnesium silicate; phosphate of various metals such as calcium phosphate; borate of various metals such as aluminum borate and magnesium borate; and complexes of these.

Examples of the organic materials constituting the grains 111 include a synthetic resin and a natural polymer. Further, specific examples thereof include a polyethylene resin; polypropylene; polyethylene oxide; polypropylene oxide; polyethylenimine; polystyrene; polyurethane; polyurea; polyester; a silicone resin; an acrylic silicone resin; a polymer using (meth)acrylic acid ester such as polymethylmethacrylate as a constituent monomer; a cross polymer (ethylene acrylic acid copolymer resin or the like) using (meth) acrylic acid ester such as a methyl methacrylate cross polymer as a constituent monomer; a polyamide resin such as Nylon 12, Nylon 6, or copolymer nylon; polyimide; carboxymethyl cellulose; gelatin; starch; chitin; and chitosan.

Among these, the grains 111 is formed of preferably an inorganic material, more preferably a metal oxide, and still more preferably silica. In this manner, it is possible to make properties such as the mechanical strength and heat resistance of the three-dimensional structure 10 particularly excellent. Further, particularly, when the grains 111 are formed of silica, the above-described effects are better exhibited. Moreover, since silica has excellent fluidity, silica is advantageous for forming the layer 1 having higher uniformity in thickness and also advantageous for making the productivity and the dimensional precision of the three-dimensional structure 10 particularly excellent.

As the hydrophobic treatment applied to the grains 111 constituting the powder for three-dimensional forming, any treatment can be performed as long as the treatment increases hydrophobicity of the grains 111 (mother particles), but a treatment of introducing a hydrocarbon group is preferable. In this manner, it is possible to increase the hydrophobicity of the grains 111. Further, it is possible to easily and reliably increase the uniformity of the hydrophobic treatment in each grain 111 or in each region of the surface of grains 111 (including the surface in the inside of the pores 1111).

As the compound used for the hydrophobic treatment, a silane compound including a silica group is preferable. Specific examples of the compound which can be used for the hydrophobic treatment include hexamethyl disilazane, dimethyl dimethoxy silane, diethyl diethoxy silane, 1-propenylmethyldichlorosilane, propyl dimethyl chlorosilane, propyl methyl dichlorosilane, propyl trichlorosilane, propyl triethoxy silane, propyl trimethoxy silane, styryl ethyl trimethoxysilane, tetradecyl trichlorosilane, 3-thiocyanate propyl triethoxysilane, p-tolyl dimethyl chlorosilane, p-tolyl methyl dichlorosilane, p-tolyl trichlorosilane, p-tolyl trimethoxysilane, p-tolyl triethoxysilane, di-n-propyldipropoxysilane, diisopropyl diisopropoxysilane, di-n-butyldi-n-butyloxysilane, di-sec-butyldi-sec-butyloxysilane, di-t-butyldi-t-butyloxysilane, octadecyl trichlorosilane, octadecyl methyl diethoxysilane, octadecyl triethoxysilane, octadecyl trimethoxysilane, octadecyl dimethyl chlorosilane, octadecyl methyl dichlorosilane, octadecyl methoxy dichlorosilane, 7-octenyl dimethyl chlorosilane, 7-octenyl trichlorosilane, 7-octenyl trimethoxysilane, octyl methyl dichlorosilane, octyl dimethyl chlorosilane, octyl trichlorosilane, 10-undecenyl dimethyl chlorosilane, undecyl trichlorosilane, vinyl dimethyl chlorosilane, methyl octadecyl dimethoxysilane, methyl dodecyl diethoxysilane, methyl octadecyl dimethoxysilane, methyl octadecyl diethoxysilane, n-octyl methyl dimethoxysilane, n-octyl methyl diethoxysilane, triacontyl dimethyl chlorosilane, triacontyl trichlorosilane, methyl trimethoxysilane, methyl triethoxysilane, methyl tri-n-propoxysilane, methyl isopropoxysilane, methyl-n-butyloxysilane, methyl tri-sec-butyloxysilane, methyl tri-t-butyloxysilane, ethyl trimethoxysilane, ethyl triethoxysilane, ethyl tri-n-propoxysilane, ethyl isopropoxysilane, ethyl-n-butyloxysilane, ethyl tri-sec-butyloxysilane, ethyl tri-t-butyloxysilane, n-propyl trimethoxysilane, isobutyl trimethoxysilane, n-hexyl trimethoxysilane, hexadecyl trimethoxysilane, n-octyl trimethoxysilane, n-dodecyl trimethoxysilane, n-octadecyl trimethoxysilane, n-propyl triethoxysilane, isobutyl triethoxysilane, n-hexyl triethoxysilane, hexadecyl triethoxysilane, n-octyl triethoxysilane, n-dodecyl trimethoxysilane, n-octadecyl triethoxysilane, 2-[2-(trichlorosilyl)ethyl]pyridine, 4-[2-(trichlorosilyl)ethyl]pyridine, diphenyl dimethoxysilane, diphenyl diethoxysilane, 1,3-(trichlorosilylmethyl)hetacosane, dibenzyl dimethoxysilane, dibenzyl diethoxysilane, phenyl trimethoxysilane, phenyl methyl dimethoxysilane, phenyl dimethyl methoxysilane, phenyl dimethoxysilane, phenyl diethoxysilane, phenyl methyl diethoxysilane, phenyl dimethyl ethoxysilane, benzyl triethoxysilane, benzyl trimethoxysilane, benzyl methyl dimethoxysilane, benzyl dimethyl methoxysilane, benzyl dimethoxysilane, benzyl dimethyl ethoxysilane, benzyl methyl diethoxysilane, benzyl methyl ethoxysilane, benzyl triethoxysilane, dibenzyl dimethoxysilane, dibenzyl diethoxysilane, 3-acetoxy propyl trimethoxysilane, 3-acryloxy propyl trimethoxysilane, aryl trimethoxysilane, aryl triethoxysilane, 4-aminobutyl triethoxysilane, (aminoethylaminomethyl)phenethyltrimethoxysilane, N-(2-aminoethyl)-3-aminopropylmethyldimethoxysilane, N-(2-aminoethyl)-3-aminopropyltrimethoxysilane, 6-(aminohexylaminopropyl) trimethoxysilane, p-aminophenyl trimethoxysilane, p-aminophenyl ethoxysilane, m-aminophenyl trimethoxysilane, m-aminophenyl ethoxysilane, 3-aminopropyl trimethoxysilane, 3-aminopropyl triethoxysilane, ω-aminoundecyl trimethoxysilane, aminotriethoxysilane, benzooxathiepine dimethyl ester, 5-(bicycleheptenyl)triethoxysilane, bis(2-hydroxyethyl)-3-aminopropyltriethoxysilane, 8-bromooctyl trimethoxysilane, bromophenyl trimethoxysilane, 3-bromopropyl trimethoxysilane, n-butyl trimethoxysilane, 2-chloromethyl triethoxysilane, chloromethyl methyl diethoxysilane, chloromethyl methyl diisopropoxysilane, p-(chloromethyl)phenyltrimethoxysilane, chloromethyl triethoxysilane, chlorophenyl triethoxysilane, 3-chloropropyl methyl dimethoxysilane, 3-chloropropyl triethoxysilane, 3-chloropropyl trimethoxysilane, 2-(4-chlorosulfonylphenyl)ethyltrimethoxysilane, 2-cyanoethyl triethoxysilane, 2-cyanoethyl trimethoxysilane, cyanomethyl phenetyl triethoxysilane, 3-cyanopropyl triethoxysilane, 2-(3-cyclohexenyl)ethyltrimethoxysilane, 2-(3-cyclohecenyl)ethyltriethoxysilane, 3-cyclohexenyl trichlorosilane, 2-(3-cyclohexenyl)ethyltrichlorosilane, 2-(3-cyclohexenyl)ethyldimethylchlorosilane, 2-(3-cyclohexenyl)ethylmethyldichlorosilane, cyclohexyl dimethyl chlorosilane, cyclohexyl ethyl dimethoxysilane, cyclohexyl methy dichlorosilane, cyclohexyl methyl dimethoxysilane, (cyclohexylmethyl)trichlorosilane, cyclohexyl trichlorosilane, cyclohexyl trimethoxysilane, cyclooctyl trichlorosilane, (4-cyclooctenyl)trichlorosilane, cyclopentyl trichlorosilane, cyclopentyl trimethoxysilane, 1,1-diethoxy-1-silacyclopenta-3-ene, 3-(2,4-dinitrophenylamino) propyltriethoxysilane, (dimethylchlorosilyl)methyl-7,7-dimethylnopinane, (cyclohexylaminomethyl) methyldiethoxysilane, (3-cyclopentadienylpropyl) triethoxysilane, N,N-diethyl-3-aminopropyltrimethoxysilane, 2-(3,4-epoxycyclohexyl) ethyltrimethoxysilane, 2-(3,4-epoxysilanecyclohexyl) ethyltrimethoxysilane, (furfuryl oxymethyl)triethoxysilane, 2-hydroxy-4-(3-triethoxypropoxy)diphenylketone, 3-(p-methoxyphenyl)propylmethyldichlorosilane, 3-(p-methoxyphenyl)propyltrichlorosilane, p-(methylphenethyl)methyldichlorosilane, p-(methylphenetyl)trichlorosilane, p-(methylphenetyl)dimethylchlorosilane, 3-morpholino propyl trimethoxysilane, (3-glycidoxypropyl)methyldiethoxysilane, 3-glycidoxypropyltrimethoxysilane, 1,2,3,4,7,7-hexachloro-6-methyldiethoxysilyl-2-norbornen, 1,2,3,4,7,7-hexachloro-6-triethoxysilyl-2-norbornene, 3-iodopropyl trimethoxysilane, 3-isocyanate propyl triethoxysilane, (mercaptomethyl)methyldiethoxysilane, 3-mercaptopropylmethyldimethoxysilane, 3-mercaptopropyl dimethoxysilane, 3-mercaptopropyl triethoxysilane, 3-methacryloxypropyl methyldiethoxysilane, 3-methacryloxypropyl trimethoxysilane, methyl{2-(3-trimethoxysilylpropylamino)ethylamino}-3-propionate, 7-octenyltrimethoxysilane, R—N-α-phenethyl-N'-triethoxysilylpropylurea, S—N-α-phenethyl-N'-triethoxysilylpropylurea, phenethyl trimethoxysilane, phenethyl methyl dimethoxysilane, phenethyl dimethyl methoxysilane, phenethyl dimethoxysilane, phenethyl diethoxysilane, phenethyl methyl diethoxysilane, phenethyl dimethyl ethoxysilane, phenethyl triethoxysilane, (3-phenylpropyl)dimethylchlorosilane, (3-phenylpropyl)methyldichlorosilane, N-phenylaminopropyl trimethoxysilane, N-(triethoxysilylpropyl)dansylamide, N-(3-triethoxysilylpropyl)-4,5-dihydroimidazole, 2-(triethoxysilylethyl)-5-(chloroacetoxy)bicycloheptane, (S)—N-triethoxysilylpropyl-o-methyl carbamate, 3-(triethoxysilylpropyl)-p-nitrobenzamide, 3-(triethoxysilyl)propyl succinic anhydride, N-[5-(trimethoxysilyl)-2-aza-1-oxo-pentyl] caprolactone, 2-(trimethoxysilylethyl)pyridine, N-(trimethoxysilylethyl)benzyl-N,N,N-trimethyl ammonium chloride, phenyl vinyl diethoxysilane, 3-thiocyanate propyl triethoxysilane, (tridecafluoro-1,1,2,2-tetrahydrooctyl)triethoxysilane, N-{3-(triethoxysilyl)propyl}phthaamic acid, (3,3,3-trifluoropropyl)methyl dimethoxysilane, (3,3,3-trifluoropropyl)trimethoxysilane, 1-trimethoxysilyl-2-(chloromethyl)phenylethane, 2-(trimethoxysilyl)ethylphenylsulfonylamide, β-trimethoxysilylethyl-2-pyridine, trimethoxy silylpropyl diethylene triamine, N-(3-trimethoxysilylpropyl) pyrrole, N-trimethoxysilylpropyl-N,N,N-tributylammoniumbromide, N-trimethoxysilylpropyl-N,N,N-tributylammoniumchloride, N-trimethoxysilylpropyl-N,N,N-trimethylammoniumchloride, vinyl methyl diethoxysilane, vinyl triethoxysilane, vinyl trimethoxysilane, vinyl methyl dimethoxysilane, vinyl methyl methoxysilane, vinyl dimethyl ethoxysilane, vinyl methyl dichlorosilane, vinyl phenyl dichlorosilane, vinyl phenyl diethoxysilane, vinyl phenyl dimethylsilane, vinyl phenyl methyl chlorosilane, vinyl triphenoxysilane, vinyl tris-t-butoxysilane, adamantly ethyl trichlorosilane, aryl phenyl trichlorosilane, (aminoethylaminomethyl)phenethyltrimethoxysilane, 3-aminophenoxy dimethyl vinylsilane, phenyl trichlorosilane, phenyl dimethyl chlorosilane, phenyl methyl dichlorosilane, benzyl trichlorosilane, benzyl dimethyl chlorosilane, benzyl methyl dichlorosilane, phenethyl diisopropyl chlorosilane, phenethyl trichlorosilane, phenethyl dimethyl chlorosilane, phenethyl methyl dichlorosilane, 5-(bicycloheptenyl)trichlorosilane, 5-(bicycloheptenyl)triethoxysilane, 2-(bicycloheptyl) dimethylchlorosilane, 2-(bicycloheptyl)trichlorosilane, 1,4-bis(trimethoxysilylethyl)benzyl, bromophenyl trichlorosilane, 3-phenoxypropyl dimethylchlorosilane, 3-phenoxypropyl trichlorosilane, t-butylphenyl chlorosilane, t-butylphenyl methoxysilane, t-butylphenyl dichlorosilane, p-(t-butyl)phenethyldimethylchlorosilane, p-(t-butyl) phenethyltrichlorosilane, 1,3-(chlorodimethylsilylmethyl) heptacosane, ((chloromethyl)phenylethyl) dimethylchlorosilane, ((chloromethyl)phenylethyl) methyldichlorosilane, ((chloromethyl)phenylethyl) trichlorosilane, ((chloromethyl)phenylethyl) trimethoxysilane, chlorophenyl trichlorosilane, 2-cyanoethyl trichlorosilane, 2-cyanoethyl methyl dichlorosilane, 3-cyanopropyl methyl dimethoxysilane, 3-cyanopropyl methyl dichlorosilane, 3-cyanopropyl methyl dichlorosilane, 3-cyanopropyl dimethyl ethoxysilane, 3-cyanopropyl methyl dichlorosilane, 3-cyanopropyl trichlorosilane, and fluorinated alkylsilane, and these can be used alone or in combination of two or more kinds thereof.

Among these, it is preferable to use hexamethyl disilazane for a hydrophobic treatment. In this manner, it is possible to increase the hydrophobicity of the grain 111. Further, it is possible to easily and reliably increase the uniformity of the hydrophobic treatment in each grain 111 or in each region of the surface of grains 111 (including the surface in the inside of the pores 1111).

In a case where the hydrophobic treatment using a silane compound in a liquid phase, it is possible to suitably promote a desirable reaction and to form a chemical adsorption film of a silane compound by immersing the grains 111 (mother particles) to which the hydrophobic treatment is applied in a liquid containing a silane compound.

In a case where the hydrophobic treatment using a silane compound in a vapor phase, it is possible to suitably promote a desirable reaction and to form a chemical adsorption film of a silane compound by exposing the grains 111 (mother particles) to which the hydrophobic treatment is applied to steam of a silane compound.

The average particle diameter of the grains 111 constituting the powder for three-dimensional forming, which is not particularly limited, is preferably in the range of 1 μm to 25 μm and more preferably in the range of 1 μm to 15 μm. In this manner, it is possible to make the mechanical strength of the three-dimensional structure 10 particularly excellent, to more effectively prevent the generation of unintentional unevenness in the three-dimensional structure 10 to be produced, and to make the dimensional precision of the three-dimensional structure 10 particularly excellent. Further, it is possible to make the fluidity of the powder for three-dimensional forming and the fluidity of the composition (composition for three-dimensional forming) 11 including the powder for three-dimensional forming particularly excellent and to make the productivity of the three-dimensional structure 10 particularly excellent.

Moreover, in the invention, the average particle diameter means the average particle diameter on the volume basis and can be acquired by adding a sample to methanol and measuring a dispersion liquid, in which the sample is dispersed by an ultrasonic disperser for 3 minutes, with a particle size distribution measuring device (TA-II type, manufactured by COULTER ELECTRONICS, Inc.) according to a coulter counter method using an aperture having a diameter of 50 μm.

Dmax of the grains 111 constituting the powder for three-dimensional forming is preferably in the range of 3 μm to 40 μm and more preferably in the range of 5 μm to 30 μm. In this manner, it is possible to make the mechanical strength of the three-dimensional structure 10 particularly excellent, to more effectively prevent the generation of unintentional unevenness in the three-dimensional structure 10 to be produced, and to make the dimensional precision of the three-dimensional structure 10 particularly excellent. Further, it is possible to make the fluidity of the powder for three-dimensional forming and the fluidity of the composition (composition for three-dimensional forming) 11 including the powder for three-dimensional forming particularly excellent and to make the productivity of the three-dimensional forming product 10 particularly excellent.

The porosity of the powder 111 constituting the powder for three-dimensional forming is preferably 50% or more and more preferably in the range of 55% to 90%. In this manner, it is possible to sufficiently have a space (pores 1111) for which the binder enters, to make the mechanical strength of the grains 111 excellent, and to make the mechanical strength of the three-dimensional structure 10 formed with the binder 121 infiltrating into the pores 1111 particularly excellent. Further, in the invention, the porosity of the grains (particles) means the ratio (volume ratio) of the pores present in the inside of the grains with respect to the apparent volume of the grains and is a value represented by "$\{(\rho 0-\rho)\}/\rho 0\} \times 100$" when the density of the grains is set as $\rho$ [g/cm$^3$] and the true density of the constituent material of the grains is set as $\rho 0$ [g/cm$^3$].

The average pore diameter (pore diameter) of the grains 111 is preferably 10 nm or more and more preferably in the range of 50 nm to 300 nm. In this manner, it is possible to make the mechanical strength of the three-dimensional structure 10 which is finally obtained particularly excellent. Further, in a case where the binding solution 12 (colored ink) including a pigment is used for producing the three-dimensional structure 10, it is possible to suitably hold the pigment in the pores 1111 of the grains 111. Accordingly, it is possible to prevent unintentional diffusion of the pigment and to reliably form a high-definition image.

The shape of the grains 111 constituting the powder for three-dimensional forming is not particularly limited, but the grains having a spherical shape are preferable. In this manner, it is possible to make the fluidity of the powder for three-dimensional forming and the fluidity of the paste-like composition (composition for three-dimensional forming) 11 including the powder for three-dimensional forming particularly excellent, to make the productivity of the three-dimensional structure 10 particularly excellent, to effectively prevent the generation or the like of unintentional unevenness in the three-dimensional structure 10 to be produced, and to make the dimensional precision of the three-dimensional structure 10 particularly excellent.

The porosity of the powder for three-dimensional forming is preferably in the range of 70% to 98% and more preferably in the range of 75% to 97.7%. In this manner, it is possible to make the mechanical strength of the three-dimensional structure 10 particularly excellent. Further, it is possible to make the fluidity of the powder for three-dimensional forming and the fluidity of the composition (composition for three-dimensional forming) 11 including the powder for three-dimensional forming particularly excellent, to make the productivity of the three-dimensional structure 10 particularly excellent, to effectively prevent the generation or the like of unintentional unevenness in the three-dimensional structure 10 to be produced, and to make the dimensional precision of the three-dimensional structure 10 particularly excellent. Moreover, in the invention the porosity of the powder for three-dimensional forming means a ratio of the total of the volume of pores included in the entirety of grains (particles) constituting the powder for three-dimensional forming and the volume of pores present among grains (particles) with respect to the capacity of the container, and is a value represented by "$\{(P0-P)/P0\} \times 100$" when the bulk density of the powder for three-dimensional forming is set as P [g/cm$^3$] and the true density of the constituent material of the powder for three-dimensional forming is set as P0 [g/cm$^3$] in a case where the container having a predetermined capacity (for example, 100 mL) is filled with the powder for three-dimensional forming.

The content ratio of the powder for three-dimensional forming in the composition (composition for three-dimensional forming) 11 is preferably in the range of 10% by mass to 90% by mass and more preferably in the range of 15% by mass to 65% by mass. In this manner, it is possible to make the fluidity of the composition (composition for three-dimensional forming) 11 sufficiently excellent and to make the mechanical strength of the three-dimensional structure 10 which is finally obtained particularly excellent.

Water-Soluble Resin

The composition 11 may include plural grains 111 and a water-soluble resin 112.

By including the water-soluble resin 112, the grains 111 are bonded (temporary fixing) to each other in a region for which the binding solution 12 of the layer 1 is not provided (see FIG. 9) and unintentional scattering of the grains 111 can be effectively prevented. In this manner, it is possible to further improve the safety of an operator and the dimensional precision of the three-dimensional structure 10 to be produced.

Further, in a case where the grains 111 are subjected to the hydrophobic treatment even when the water-soluble resin 112 is included, the water-soluble resin 112 is effectively prevented from entering the pores 1111 of the grains 111. Accordingly, the function of the water-soluble resin 112 which temporarily fixes the grains 111 to each other is reliably exhibited. In addition, a problem in that a space for which the binder 121 enters may not be secured because the water-soluble resin 112 enters the pores 1111 of the grains 111 in advance can be reliably prevented.

It is preferable that at least a part of the water-soluble resin 112 is soluble in water. For example, the solubility in water at 25° C. (mass of the water-soluble resin soluble in 100 g of water) is preferably 5 [g/100 g of water] or more and more preferably 10 [g/100 g of water] or more.

Examples of the water-soluble resin 112 include synthetic polymers such as polyvinyl alcohol (PVA), polyvinylpyrrolidone (PVP), polycaprolactone diol, sodium polyacrylate, polyacrylamide, modified polyamide, polyethylene imine, polyethylene oxide, and a random copolymer of ethylene oxide and propylene oxide; natural polymers such as cornstarch, mannan, pectin, agar, alginic acid, dextran, glue, and gelatin; and semi-synthetic polymers such as carboxymethyl cellulose, hydroxyethyl cellulose, oxidized starch, and modified starch, and these can be used alone or in combination of two or more kinds thereof.

Specific examples of the water-soluble resin product include methyl cellulose (Metolose SM-15, manufactured by Shin-Etsu Chemical Co., Ltd.), hydroxyethyl cellulose (AL-15, manufactured by Fuji Chemical Industries, Ltd.), hydroxypropyl cellulose (HPC-M, manufactured by NIPPON SODA CO., LTD.), carboxymethyl cellulose (CMC-30, manufactured by Nichirin Chemical Industries, Ltd.), sodium starch phosphate ester (I) (HOSTER 5100, manufactured by Matsutani Chemical Industry Co., Ltd.), polyvinylpyrrolidone (PVP K-90, manufactured by Tokyo Chemical Co., Ltd.), methyl vinyl ether/maleic acid anhydride polymer (AN-139, manufactured by GAF Gauntlet, Inc.), polyacrylamide (manufactured by Wako Pure Chemical Industries, Ltd.), modified polyamide (modified nylon, AQ NYLON, manufactured by Toray Industries, Inc.), polyethylene oxide (PEO-1, manufactured by Steel Chemical Co., Ltd., ALKOX, manufactured by Meisei Chemical Industries Co., Ltd.), a random copolymer of ethylene oxide and propylene oxide (ALKOX EP, manufactured by Meisei Chemical Industries Co., Ltd.), sodium polyacrylate (manufactured by Wako Pure Chemical Industries, Ltd.), and carboxy vinyl polymer/cross-linked acrylic water-soluble resin (AQUPEC, manufactured by Sumitomo Seika Chemicals Co., Ltd.).

Among these, in a case where the water-soluble resin 112 is polyvinyl alcohol, it is possible to make the mechanical strength of the three-dimensional structure 10 particularly excellent. Further, by adjusting the degree of saponification or the degree of polymerization, it is possible to more suitably control properties of the water-soluble resin 112 (for example, water-soluble properties or water resistance properties) and properties of the composition 11 (for example, the viscosity, the fixed power of the grains 111, or the wettability). Accordingly, it is possible to more suitably respond to production of various three-dimensional structures 10. Further, polyvinyl alcohol is low in price among various kinds of water-soluble resins and the supply thereof is stabilized. Therefore, it is possible to produce a stabilized three-dimensional structure 10 while reducing the production cost.

In a case where the water-soluble resin 112 includes polyvinyl alcohol, the degree of saponification of the polyvinyl alcohol is preferably in the range of 85 to 90. In this manner, it is possible to suppress a decrease in solubility of polyvinyl alcohol in water. Accordingly, it is possible to more effectively suppress a decrease in adhesiveness between adjacent layers 1 in a case where the composition 11 contains water.

In a case where the water-soluble resin 112 contains polyvinyl alcohol, the degree of polymerization of the polyvinyl alcohol is preferably in the range of 300 to 1000. In this manner, in the case where the composition 11 contains water, it is possible to make the mechanical strength of each layer 1 or the adhesiveness between adjacent layers 1 particularly excellent.

Further, in a case where the water-soluble resin 112 is polyvinylpyrrolidone (PVP), the following effects can be obtained. That is, since polyvinylpyrrolidone has excellent adhesiveness with respect to various materials such as glass, metal, or plastic, it is possible to make the stability of the strength or the shape of a region for which the binding solution 12 is not provided in the layer 1 particularly excellent and to make the dimensional precision of the three-dimensional structure 10 which is finally obtained particularly excellent. Further, since polyvinylpyrrolidone shows excellent solubility in various organic solvents, in a case where the composition 11 includes an organic solvent, it is possible to make the fluidity of the composition 11 particularly excellent, to suitably form the layer 1 in which unintentional unevenness in thickness is more effectively prevented, and to make the dimensional precision of the three-dimensional structure 10 which is finally obtained particularly excellent. Further, since polyvinylpyrrolidone shows excellent solubility in water, grains which are not bonded with the binder 121 can be easily and reliably removed from the grains 111 constituting each layer 1 during the unbonded particle removing process (after forming is completed). Moreover, since polyvinylpyrrolidone has suitable affinity for the powder for three-dimensional forming, polyvinylpyrrolidone is unlikely to enter the pores 1111 as described above, but the wettability with respect to the surface of the grains 111 is relatively high. Therefore, it is possible to more effectively exhibit the function of fixing the grains temporarily as described above. Further, since polyvinylpyrrolidone has excellent affinity for various colorants, unintentional diffusion of a colorant can be effectively prevented in a case where the binding solution 12 including a colorant is used during the binding solution providing process. In addition, when the paste-like composition 11 contains polyvinylpyrrolidone, it is possible to effectively prevent bubbles from being rolled in the composition 11 and to more effectively prevent the generation of defects due to rolling-in of bubbles during the layer forming process.

In a case where the water-soluble resin 112 contains polyvinylpyrrolidone, the weight average molecular weight of the polyvinylpyrrolidone is preferably in the range of 10000 to 1700000 and more preferably in the range of 30000 to 1500000. In this manner, the above-described functions can be more effectively exhibited.

Further, in a case where the water-soluble resin 112 is polycaprolactone diol, it is possible to make the composition 11 have a pellet shape and to more effectively prevent unintentional scattering or the like of the grains 111. Accordingly, the handleability (easiness of handling) of the composition 11 is improved, and accordingly, it is possible to improve the stability of an operator and the dimensional precision of the three-dimensional structure 10 to be produced and to allow the three-dimensional structure 10 to be melted at a relatively low temperature. Therefore, it is possible to suppress the energy and the cost necessary for production of the three-dimensional structure 10 and to make the productivity of the three-dimensional structure 10 sufficiently excellent.

In a case where the water-soluble resin 112 contains polycarolactone diol, the weight average molecular weight of the polycarolactone diol is preferably in the range of 10000 to 1700000 and more preferably in the range of 30000 to 1500000. In this manner, the above-described functions can be more effectively exhibited.

In the composition 11, it is preferable that the water-soluble resin 112 is in a state of a liquid (for example, a dissolved state or a melted state) at least during the layer forming process. In this manner, it is possible to easily and reliably further improve the uniformity in thickness of the layer 1 to be formed using the composition 11.

Solvent

The composition 11 may include a volatile solvent (not illustrated in FIG. 9) in addition to the above-described components.

In this manner, it is possible to make the composition 11 have a paste shape, to make the fluidity of the composition 11 stably excellent, and to make the productivity of the three-dimensional structure 10 particularly excellent. The reason for this is as follows. That is, in the invention, it is preferable to decrease the fluidity of a layer formed using the composition from viewpoints of stability of the shape of the layer and preventing unintentional wetting spreadability of the binding solution at the time of forming a binding unit (the binding solution providing process and the curing process), but the fluidity of the layer can be decreased by removing (volatilizing) a solvent in a case where the composition contains the solvent. Meanwhile, for example, in a case where components contained in the composition are melted, the temperature of the composition (layer) needs to be decreased in order to decrease the fluidity of the layer formed using the composition, but adjustment of the fluidity by means of removing the solvent can be easily and rapidly performed compared to adjustment of the fluidity by means of adjusting the temperature thereof. In addition, when the fluidity is adjusted by adjusting the temperature thereof, it is difficult to stably control the fluidity of the layer because the fluidity of the layer relatively largely fluctuates due to the temperature. Meanwhile, when the fluidity is adjusted by removing the solvent, the fluidity of the layer can be easily and stably controlled. Further, in a case where components contained in the composition are to be melted, heating and cooling of the composition need to be repeatedly performed and this process requires a relatively large amount of energy. Meanwhile, when a solvent is used, the amount of energy to be used can be suppressed. Therefore, it is preferable to use a solvent from a viewpoint of saving energy.

It is preferable that a solvent dissolves the water-soluble resin 112. In this manner, it is possible to make the fluidity of the composition 11 excellent and to more effectively prevent unintentional unevenness in thickness of the layer 1 to be formed using the composition 11. Further, when the layer 1 in a state in which a solvent is removed is formed, it is possible to adhere the water-soluble resin 112 to the grains 111 with excellent uniformity over the entire layer 1 and to more effectively prevent the generation of unintentional unevenness in composition. Therefore, it is possible to more effectively prevent the generation of unintentional unevenness in mechanical strength in each region of the three-dimensional structure 10 which is finally obtained and to further improve the reliability of the three-dimensional structure 10. Further, in the configuration illustrated in FIG. 9, a solvent is not illustrated and the water-soluble resin 112 is adhered to a part of the outer surface of the grains 111 in a state in which the water-soluble resin 112 is deposited. However, in a case where a solvent is included, the water-soluble resin 112 is included in the composition 11 in a state of being dissolved in the solvent and the solvent may be present in a state of wetting the surface of the grains 111 (for example, a surface other than the surface of the pores 1111 of the grains 111).

Examples of the solvent constituting the composition 11 include water; an alcohol-based solvent such as methanol, ethanol, or isopropanol; a ketone-based solvent such as methyl ethyl ketone or acetone; a glycol ether-based solvent such as ethylene glycol monoethyl ether or ethylene glycol monobutyl ether; a glycol ether acetate-based solvent such as propylene glycol 1-monomethylether 2-acetate or propylene glycol 1-monoethylether 2-acetate; polyethylene glycol; and polypropylene glycol, and these can be used alone or in combination of two or more kinds thereof.

It is preferable that the composition 11 contains water among those described above. In this manner, it is possible to reliably dissolve the water-soluble resin 112 and to make the fluidity of the composition 11 and the uniformity of the composition of the layer 1 to be formed using the composition 11 particularly excellent. Further, water can be easily removed after the layer 1 is formed and does not adversely affect the three-dimensional structure 10 when water remains therein. Moreover, water is advantageous from viewpoints of stability with respect to a human body and environmental problems.

In a case where the composition 11 includes a solvent, the content ratio of the solvent in the composition 11 is preferably in the range of 5% by mass to 75% by mass and more preferably in the range of 35% by mass to 70% by mass. In this manner, since effects generated when a solvent is included are better exhibited and the solvent can be easily removed in a short period of time during the process of producing the three-dimensional structure 10, a solvent is advantageous from a viewpoint of improving productivity of the three-dimensional structure 10.

Particularly, in a case where the composition 11 includes water as a solvent, the content ratio of water in the composition 11 is preferably in the range of 20% by mass to 73% by mass and more preferably in the range of 50% by mass to 70% by mass. In this manner, effects described above are better exhibited.

Other Components

Further, the composition 11 may contain components other than those described above. Examples of the components include a polymerization initiator, a polymerization accelerator, a permeation promotor, a wetting agent (moisturizing agent), a fixing agent, a fungicide, a preservative, an antioxidant, a UV absorber, a chelating agent, and a pH adjusting agent.

Binding Solution

Hereinafter, the binding solution used to produce the three-dimensional structure of the invention will be described in detail.

The binding solution 12 contains at least the binder 121.

Binder

The binder 121 is not particularly limited as long as the binding solution has a function of binding the grains 111, but a binder including pores 1111 described below as the grains 111 and having hydrophobicity (lipophilicity) in a case of using a binding solution to which a hydrophobic treatment is applied is preferable. In this manner, the affinity between the binding solution 12 and the grains 111 to which a hydrophobic treatment is applied can be increased and the binding solution 12 can suitably enter the pores 1111 of the grains 111 to which the hydrophobic treatment is applied by providing the binding solution 12 for the layer 1. As a result, the anchor effect due to the binder 121 is remarkably exhibited and thus it is possible to make the mechanical strength of the three-dimensional structure 10 which is finally obtained particularly excellent. In addition, it is preferable that the hydrophobic binder 121 has sufficiently low affinity for water. For example, the binding solution whose solubility in water at 25° C. is 1 [g/100 g of water] or less is preferable.

Examples of the binder 121 include various light curable resins such as a thermosetting resin, a thermosetting resin, a visible light curable resin that is cured by light in a visible light region (light curable resin in the narrow sense), a UV curable resin, and an infrared curable resin; and an X-ray curable resin, and these can be used alone or in combination of two or more kinds thereof. It is preferable that the binder 121 includes a thermosetting resin from a viewpoint of mechanical strength of the three-dimensional structure 10 to be obtained and the productivity of the three-dimensional structure 10. Further, among various thermosetting resins, a UV thermosetting resin (polymerizable compound) is particularly preferable from viewpoints of the mechanical strength of the three-dimensional structure 10, the productivity of the three-dimensional structure 10, and the storage stability of the binding solution 12.

As the UV curable resin (polymerizable compound), a resin in which addition polymerization or ring-opening polymerization is started by radicals or cations generated from a photopolymerization initiator due to irradiation with UV rays and a polymer is generated is preferably used. Examples of the polymerization mode of the addition polymerization include a radical, a cation, an anion, a metathesis, and coordination polymerization, and examples of the polymerization mode of the ring-opening polymerization include a cation, an anion, a radical, a metathesis, and coordination polymerization.

As an addition-polymerizable compound, a compound having at least one ethylenically unsaturated double bond can be exemplified. As the addition-polymerizable compound, a compound having at least one and preferably two or more terminal ethylenically unsaturated bonds can be preferably used.

The ethylenically unsaturated polymerizable compound has a chemical form of a monofunctional polymerizable compound and a polyfunctional polymerizable compound or a mixture of these two. Examples of the monofunctional polymerizable compound include unsaturated carboxylic acid (for example, acrylic acid, methacrylic acid, itaconic acid, crotonic acid, isocrotonic acid, or maleic acid), esters thereof, and amides. As the polyfunctional polymerizable compounds, esters of unsaturated carboxylic acid and an aliphatic polyhydric alcohol compound and amides of unsaturated carboxylic acid and an aliphatic amine compound are used.

Further, an addition reaction product of unsaturated carboxylic acid esters or amides having a nucleophilic substituent such as a hydroxyl group, an amino group, or a mercapto group; isocyanates; and epoxys, and a dehydration condensation reaction product with carboxylic acid can be used. Further, an addition reaction product of unsaturated carboxylic acid esters or amides having an electrophilic substituent such as an isocyanate group or an epoxy group; alcohols; amines; and thiols, and a substitution reaction product of unsaturated carboxylic acid esters or amides having a dissociable substituent such as a halogen group or a tosyloxy group; alcohols; amines; or thiols can be used.

Specific examples of a radical polymerizable compound which is an ester between unsaturated carboxylic acid and an aliphatic polyhydric alcohol compound include (meth) acrylic acid ester as a typical example, a monofunctional (meth)acrylic acid ester, and a polyfunctional (meth)acrylic acid ester.

Specific examples of the monofunctional (meth)acrylate include tolyloxyethyl(meth)acrylate, phenyloxyethyl(meth) acrylate, cyclohexyl(meth)acrylate, ethyl(meth)acrylate, methyl(meth)acrylate, isobornyl(meth)acrylate, and tetrahydrofurfuryl(meth)acrylate.

Specific examples of the difunctional (meth)acrylate include ethyleneglycol di(meth)acrylate, triethyleneglycol di(meth)acrylate, 1,3-butanediol di(meth)acrylate, tetramethyleneglycol di(meth)acrylate, propyleneglycol di(meth) acrylate, neopentylglycol di(meth)acrylate, hexanediol di(meth)acrylate, 1,4-cyclohexanediol di(meth)acrylate, tetraethyleneglycol di(meth)acrylate, pentaerythritol di(meth) acrylate, and dipentaerythritol di(meth)acrylate.

Specific examples of the trifuctional (meth)acrylate include trimethylolpropane tri(meth)acrylate, trimethylolethane tri(meth)acrylate, alkyleneoxide-modified tri(meth) acrylate of trimethylolpropane, pentaerythritol tri(meth) acrylate, dipentaerythritol tri(meth)acrylate, trimethylolpropane tri((meth)acryloyloxypropyl)ether, isocyanuric acid alkyleneoxide-modified tri(meth)acrylate, propionic acid dipentaerythritol tri(meth)acrylate, tri((meth) acryloyloxyethyl)isocyanurate, hydroxypivalaldehyde-modified dimethylolpropane tri(meth)acrylate, and sorbitol tri(meth)acrylate.

Specific examples of the tetrafunctional (meth)acrylate include pentaerythritol tetra(meth)acrylate, sorbitol tetra(meth)acrylate, ditrimethylolpropane tetra(meth)acrylate, propionic acid dipentaerythritol tetra(meth)acrylate, and ethoxylated pentaerythritol tetra(meth)acrylate.

Specific examples of the pentafunctional (meth)acrylate include sorbitol penta(meth)acrylate and dipentaerythritol penta(meth)acrylate.

Specific examples of the hexafunctional (meth)acrylate include dipentaerythritol hexa(meth)acrylate, sorbitol hexa (meth)acrylate, alkyleneoxide-modified hexa(meth)acrylate of phosphazene, and caprolactone-modified dipentaerythritol hexa(meth)acrylate.

Examples of the polymerizable compounds other than (meth)acrylate include itaconic acid ester, crotonic acid ester, isocrotonic acid ester, and maleic acid ester.

Examples of the itaconic acid ester include ethylene glycol diitaconate, propylene glycol diitaconate, 1,3-butanediol diitaconate, 1,4-butanediol diitaconate, tetramethylene glycol diitaconate, pentaerythritol diitaconate, and sorbitol tetraitaconate.

Examples of crotonic acid ester include ethylene glycol dicrotonate, tetramethylene glycol dicrotonate, pentaerythritol dicrotonate, and sorbitol dicrotonate.

Examples of isocrotonic acid ester include ethylene glycol diisocrotonate, pentaerythritol diisocrotonate, and sorbitol tetraisocrotonate.

Examples of maleic acid ester include ethylene glycol dimaleate, triethylene glycol dimaleate, pentaerythritol dimaleate, and sorbitol tetramaleate.

Examples of other esters include aliphatic alcohol esters described in JP-B-46-27926, JP-B-51-47334, JP-A-57-196231; esters having an aromatic skeleton described in JP-A-59-5240, JP-A-59-5241, and JP-A-2-226149, and esters containing an amino group described in JP-A-1-165613.

Specific examples of monomers of amide between unsaturated carboxylic acid and an aliphatic amine compound include methylene bis-acrylamide, methylene bis-methacrylamide, 1,6-hexamethylene bis-acrylamide, 1,6-hexamethylene bis-methacrylamide, diethylenetriamine trisacrylamide, xylylene bis-acrylamide, and xylylene bis-methacrylamide.

Preferred examples of other amide-based monomers include monomers having a cyclohexylene structure described in JP-B-54-21726 can be exemplified.

Further, a urethane-based addition polymerizable compound to be produced using an addition reaction between isocyanate and a hydroxyl group is preferable and specific examples thereof include a vinyl urethane compound containing two or more polymerizable vinyl groups in one molecule which is obtained by adding a vinyl monomer containing a hydroxyl group represented by the following formula (1) to a polyisocyanate compound having two or more isocyanate groups in one molecule described in JP-B-48-41708.

$$CH_2=C(R^1)COOCH_2CH(R^2)OH \qquad (1)$$

(in this case, $R^1$ and $R^2$ each independently represent H or $CH_3$ in the formula (1))

In the invention, a cationic ring-opening polymerizable compound having one or more cyclic ether groups such as an epoxy group or an oxetane group in one molecule can be preferably used as a UV curable resin (polymerizable compound).

Examples of the cationically polymerizable compound include curable compounds containing a ring-opening polymerizable group, and, among these, a heterocyclic group-containing curable compound is particularly preferable. Examples of the curable compound include cycle imino ethers such as an epoxy derivative, an oxetane derivative, a tetrahydrofuran derivative, a cyclic lactone derivative, a cyclic carbonate derivative, and an oxazoline derivative, and vinyl ethers. Among these, an epoxy derivative, an oxetane derivative, and vinyl ethers are preferable.

Preferred examples of the epoxy derivative include monofunctional glycidyl ethers, polyfunctional glycidyl ethers, monofunctional alicyclic epoxys, and polyfunctional alicyclic epoxys.

Specific examples of the compounds of glycidyl ethers include diglycidyl ethers (for example, ethylene glycol diglycidyl ether and bisphenol A diglycidyl ether); tri- or higher functional glycidyl ethers (for example, trimethylol ethane triglycidyl ether, trimethylol propane triglycidyl ether, glycerol triglycidyl ether, and triglycidyl trishydroxy-ethyl isocyanurate); tetra- or higher functional glycidyl ethers (for example, sorbitol tetraglycidyl ether, pentaerythritol tetraglycidyl ether, polyglycidyl ether of a cresol novolac resin, and polyglycidyl ether of a phenyl novolac resin); alicyclic epoxys (for example, CELLOXIDE 2021P, CELLOXIDE 2081, Epolead GT-301, and Epolead GT-401 (all manufactured by Daicel Chemical Industries, Ltd.)); EHPE (manufactured by Daicel Chemical Industries, Ltd.); polycyclohexyl epoxy methyl ether of a phenol novolac resin; oxetanes (for example, OX-SQ and PNOX-1009 (both manufactured by Toagosei Co., Ltd.).

As the polymerizable compound, an alicyclic epoxy derivative can be preferably used. The term "alicyclic epoxy group" means a partial structure obtained by epoxidizing a double bond of a cycloalkene ring such as a cyclopentene group or a cyclohexene group with a suitable oxidant such as hydrogen peroxide or peracid.

As the alicyclic epoxy compound, polyfunctional alicyclic epoxys having two or more cyclohexene oxide groups or cyclopentene oxide groups in one molecule are preferable. Specific examples of the alicyclic epoxy compound include 4-vinylcyclohexene dioxide, (3,4-epoxychclohexyl)methyl-3,4-epoxycyclohexyl carboxylate, di(3,4-epoxycyclohexyl) adipate, di(3,4-epoxycyclohexylmethyl)adipate, bis(2,3-epoxycyclopentyl)ether, di(2,3-epoxy-6-methylcyclohexylmethyl)adipate, and dicyclopentadiene dioxide.

The glycidyl compound having a normal epoxy group which does not include an alicyclic structure in a molecule may be used alone or in combination with the above-described alicyclic epoxy compound.

As such a normal glycidyl compound, for example, a glycidyl ether compound or a glycidyl ester compound can be exemplified, but a combination with a glycidyl ether compound is preferable.

Specific examples of the glycidyl ether compound include an aromatic glycidyl ether compound such as 1,3-bis(2,3-epoxypropyloxy)benzene, a bisphenol A type epoxy resin, a bisphenol F type epoxy resin, a phenol•novolac type epoxy resin, a cresol novolac type epoxy resin, or a trisphenol methane type epoxy resin; and an aliphatic glycidyl ether compound such as 1,4-butanediol glycidyl ether, glycerol triglycidyl ether, propylene glycol diglycidyl ether, or trimethylol propane triglycidyl ether. As the glycidyl ester, for example, glycidyl ester of linolenic acid dimer or the like can be exemplified.

As the polymerizable compound, a compound having an oxetanyl group which is cyclic ether of a 4-membered ring (hereinafter, simply referred to as an "oxetane compound") can be used. The oxetanyl group-containing compound is a compound having one or more oxetanyl groups in one molecule.

The content ratio of the binder in the binding solution 12 is preferably 80% or more and more preferably 85% or more. In this manner, it is possible to make the mechanical strength of the three-dimensional structure 10 which is finally obtained particularly excellent.

Other Components

Further, the binding solution 12 may contain other components other than those described above. Examples of such components include various colorants such as a pigment and a dye; a dispersant; a surfactant; a sensitizer; a polymerization accelerator; a solvent; a permeation promotor; a wetting agent (moisturizing agent); a fixing agent; a fungicide; a preservative; an antioxidant; a UV absorber; a chelating agent; a pH adjusting agent; a thickener; a filler; an aggregation inhibitor; and a defoaming agent.

Particularly, when the binding solution 12 contains a colorant, the three-dimensional structure 10 colored in a color corresponding to the color of the colorant can be obtained.

Particularly, when the colorant includes a pigment, it is possible to make the light resistance of the binding solution 12 and the three-dimensional structure 10 excellent. Any of an inorganic pigment and an organic pigment can be used as a pigment.

Examples of the inorganic pigment include carbon blacks such as furnace black, lamp black, acetylene black, and channel black (C.I. Pigment Black 7); iron oxide; and titanium oxide, and these can be used alone or in combination of two or more kinds thereof.

Among the inorganic pigments, titanium oxide is preferable in order to express a preferred white color.

Examples of the organic pigments include an azo pigment such as an insoluble azo pigment, a condensed azo pigment, azo lake, or a chelate azo pigment; a polycyclic pigment such as a phthalocyanine pigment, a perylene and perinone pigment, an anthraquinone pigment, a quinacridone pigment, a dioxane pigment, a thioindigo pigment, an isoindolinone pigment, or a quinophthalone pigment; dye chelate (for example, basic dye chelate or acidic dye chelate); dye lake (basic dye lake or acidic dye lake); a nitro pigment; a nitroso pigment; aniline black; and daylight fluorescent pigment, and these can be used alone or in combination of two or more kinds thereof.

More specifically, examples of the carbon black used as a black pigment include No. 2300, No. 900, MCF88, No. 33, No. 40, No. 45, No. 52, MA7, MA8, MA100, and No. 2200B (all manufactured by Mitsubishi Chemical Corporation); Raven 5750, Raven 5250, Raven 5000, Raven 3500, Raven 1255, and Raven 700 (all manufactured by Carbon Columbia); Regal 400R, Regal 330R, Regal 660R, Mogul L, Monarch 700, Monarch 800, Monarch 880, Monarch 900, Monarch 1000, Monarch 1100, Monarch 1300, and Monarch 1400 (all manufactured by CABOT JAPAN K.K.); Color Black FW1, Color Black FW2, Color Black FW2V, Color Black FW18, Color Black FW200, Color Black 5150, Color Black 5160, Color Black S170, Printex 35, Printex U, Printex V, Printex 140U, Special Black 6, Special Black 5, Special Black 4A, and Special Black 4 (all manufactured by Degussa).

Examples of the white pigment include C.I. Pigment White 6, 18, and 21.

Examples of the yellow pigment include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of the magenta pigment include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48, (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245; and C.I. Pigment Violet Red 19, 23, 32, 33, 36, 38, 43, and 50.

Examples of the cyan pigment include C.I. Pigment Blue 1, 2, 3, 15, 15:1, 15:2, 15:3, 15:34, 15:4, 16, 18, 22, 25, 60, 65, and 66; and C.I. Pigment Bat Blue 4 and 60.

Further, examples of other pigments include C.I. Pigment Green 7 and 10; C.I. Pigment Brown 3, 5, 25, and 26; and C.I. Pigment Orange 1, 2, 5, 7, 13, 14, 15, 16, 24, 34, 36, 38, 40, 43, and 63.

In a case where the binding solution 12 contains a pigment, the average particle diameter of the pigment is preferably 300 nm or less and more preferably 50 nm to 250 nm. In this manner, it is possible to make the ejection stability of the binding solution 12 and the dispersion stability of the pigment in the binding solution 12 particularly excellent and to form an image with more excellent image quality.

Further, examples of the dye include an acid dye, a direct dye, a reactive dye, and a basic dye, and these can be used alone or in combination of two or more kinds thereof.

Specific examples thereof include C.I. Acid Yellow 17, 23, 42, 44, 79, and 142; C.I. Acid Red 52, 80, 82, 249, 254, and 289; C.I. Acid Blue 9, 45, and 249; C.I. Acid Black 1, 2, 24, and 94; C.I. Food Black 1 and 2; C.I. Direct Yellow 1, 12, 24, 33, 50, 55, 58, 86, 132, 142, 144, and 173; C.I. Direct Red 1, 4, 9, 80, 81, 225, and 227; C.I. Direct Blue 1, 2, 15, 71, 86, 87, 98, 165, 199, and 202; C.I. Direct Black 19, 38, 51, 71, 154, 168, 171, and 195; C.I. Reactive Red 14, 32, 55, 79, and 249; and C.I. Reactive Black 3, 4, and 35.

In a case where the binding solution 12 includes a colorant, the content ratio of the colorant in the binding solution 12 is preferably in the range of 1% by mass to 20% by mass. In this manner, particularly excellent hiding properties and color reproducibility can be obtained.

Particularly, in a case where the binding solution 12 contains titanium oxide as a colorant, the content ratio of the titanium oxide in the binding solution 12 for forming an entity portion is preferably in the range of 12% by mass to 18% by mass and more preferably in the range of 14% by mass to 16% by mass. In this manner, particularly excellent hiding properties can be obtained.

In a case where the binding solution 12 contains a pigment, when the ink further contains a dispersant, it is possible to make the dispersibility of the pigment more excellent. As the dispersant, which is not particularly limited, a dispersant normally used for preparing a pigment dispersion liquid of a polymer dispersant or the like can be exemplified. Specific examples of the polymer dispersant include dispersants having one or more kinds, as a main component, among polyoxyalkylene polyalkylene polyamine, a vinyl polymer, a vinyl copolymer, an acrylic polymer, an acrylic copolymer, polyester, polyamide, polyimide, polyurethane, an amino polymer, a silicon-containing polymer, a sulfur-containing polymer, a fluorine-containing polymer, and an epoxy polymer. Examples of a commercially available product of the polymer dispersant include AJISPER series (manufactured by Ajinomoto Fine-Techno Co., Inc.); Solsperse series (Solsperse 36000 or the like) which can be obtained from Noveon; and Disperbyk series (manufactured by BYK-Chemie Co., Ltd.); and DISPARLON series (manufactured by Kusumoto Chemicals, Ltd.).

In a case where the binding solution 12 contains a surfactant, it is possible to make the abrasion resistance of the three-dimensional structure 10 more excellent. As a surfactant, which is not particularly limited, polyester-modified silicone or polyether-modified silicone can be used as a silicone-based surfactant, and polyether-modified polydimethylsiloxane or polyester-modified polydimethylsiloxane is preferably used. Specific examples of the surfactant include BYK-347, BYK-348, BYK-UV3500, 3510, 3530, and 3570 (all manufactured by manufactured by BYK-Chemie Co., Ltd.).

Further, the binding solution 12 may include a solvent. In this manner, it is possible to suitably adjust the viscosity of the binding solution 12 and to make the ejection stability of the binding solution 12 according to an ink jet method particularly excellent even when the binding solution 12 contains components with high viscosity.

Examples of the solvent include (poly)alkylene glycol monoalkyl ethers such as ethylene glycol monomethyl ether, ethylene glycol monoethyl ether, propylene glycol monomethyl ether, and propylene glycol monoethyl ether; acetic acid esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetyl acetone; and alcohols such as ethanol, propanol, and butanol, and these can be used alone or in combination of two or more kinds thereof.

Further, the viscosity of the binding solution 12 is preferably in the range of 10 mPa·s to 30 mPa·s and more preferably in the range of 15 mPa·s to 25 mPa·s. In this manner, it is possible to make the ejection stability of the binding solution 12 particularly excellent. Further, in the present specification, the viscosity is a value measured using an E type viscometer (VISCONIC ELD, manufactured by Tokyo Keiki Co., Ltd.) at 25° C. unless otherwise specified conditions. Further, plural binding solutions 12 may be used for producing the three-dimensional structure 10.

For example, the binding solution 12 (colored ink) containing a colorant and the binding solution 12 (clear ink) containing no colorant may be used. In this manner, for example, the binding solution 12 containing a colorant as the binding solution 12 provided for an area influencing the color tone of the appearance of the three-dimensional structure 10 or the binding solution 12 containing no colorant as the binding solution 12 provided for an area not influencing the color tone of the appearance the three-dimensional structure 10 may be used. Further, in the three-dimensional structure 10 which is finally obtained, plural kinds of binding solutions 12 may be used together such that an area (coat layer) formed using the binding solution 12 containing no colorant is provided on the outermost surface of the area formed using the binding solution 12 containing a colorant.

In addition, for example, plural kinds of binding solutions 12 containing colorants with different compositions from each other may be used. In this manner, a color reproduction area which can be expressed can be widened because of the combination of these binding solutions 12.

When plural kinds of binding solutions 12 are used, it is preferable to use at least an indigo purple (cyan) binding solution 12, a red purple (magenta) binding solution 12, and a yellow binding solution 12. In this manner, a color reproduction area which can be expressed can be more widened because of the combination of these binding solutions 12.

Further, for example, the following effects can be obtained by combining a white binding solution 12 and a binding solution 12 having another color. That is, the three-dimensional structure 10 which is finally obtained may have a first area for which the white binding solution 12 is provided and an area (second area), which is overlapped with the first area and for which the binding solution 12 having a non-white color, provided on the outer surface side more than the first area. In this manner, the first area for which the white binding solution 12 is provided can exhibit hiding properties and the color saturation of the three-dimensional structure 10 can be further improved.

Three-Dimensional Structure

The three-dimensional structure of the invention can be produced using the production method and the apparatus for producing a three-dimensional structure described above.

As described above, according to the production method and the apparatus for producing a three-dimensional structure of the invention, since the three-dimensional structure can be efficiently produced while reducing the amount of the composition for a three-dimensional forming to be used, it is advantageous to reduce the production cost of the three-dimensional structure. Therefore, the three-dimensional structure of the invention can be produced in a low price.

As the usage of the three-dimensional structure of the invention, which is not particularly limited, an object for appreciation or display such as a doll or a figure; and a medical device such as an implant can be exemplified.

Further, the three-dimensional structure of the invention may be applied to any of a prototype, a mass-produced product, or an order-made product.

Hereinbefore, preferred embodiments of the invention have been described, but the invention is not limited thereto.

For example, in the above-described embodiments, a configuration in which the stage is descended along with repeated formation of layers has been described as a typical example, but, in the invention, the relative position of the stage may be directed downward by elevating the dispenser or the like.

In addition, a roller or the like may be used in place of the squeegee described above as the flattening unit.

Moreover, the apparatus for producing a three-dimensional structure of the invention may include a recovery mechanism (not illustrated) for recovering compositions which are not used for forming a layer among the supplied compositions. In this manner, since it is possible to prevent excessive amount of compositions from being stored in the layer forming unit and to supply a sufficient amount of compositions, generation of defects in the layer can be more effectively prevented and the three-dimensional structure can be more stably produced. Further, since the recovered compositions can be used for production of the three-dimensional structure, this can contribute to reducing the production cost of the three-dimensional structure, which is preferable from a viewpoint of saving resources.

Further, the apparatus for producing a three-dimensional structure of the invention may include a recovery mechanism for recovering compositions which are removed during the unbonded particle removing process.

In addition, in the above-described embodiments, the description is made that bonding units are formed on all layers, but layers on which bonding units are not formed may be present. For example, a layer formed directly on the stage does not have a bonding unit formed thereon and may function as a sacrificial layer.

Moreover, in the above-described embodiments, the case in which the binding solution providing process is performed according to an ink jet method is mainly described, but the binding solution providing process may be performed using another method (for example, another printing method).

Further, in the above-described embodiments, the case where the composition is supplied to only a portion of the forming area is mainly described, but, in the invention, the composition may be supplied to the entire forming area.

Moreover, in the above-described embodiments, in addition to the layer forming process and the binding solution providing process, the description is made that the curing process is repeatedly performed along with the layer forming process and the binding solution providing process, but the curing process may not be repeatedly performed. For example, a laminate including plural layers which are not cured is formed and then the process may be collectively performed.

Further, in the production method of the invention, a pre-treatment process, an intermediate treatment process, and a post-treatment process may be performed if necessary.

As the pre-treatment process, for example, a cleaning process or the like of the stage can be exemplified.

As the intermediate treatment process, a process of stopping heating (water-soluble resin solidifying process) may be included between the layer forming process and the binding solution providing process in the case where the composition for three-dimensional forming has a pellet shape. In this manner, since the water-soluble resin enters a solid state, it is possible to obtain a layer with high bonding strength among grains. Further, for example, in the case where the composition for three-dimensional forming contains a solvent component (dispersant) such as water, a solvent component removing process removing the solvent component may be included between the layer forming process and the binding solution providing process. In this manner, the layer forming process can be more smoothly performed and unintentional unevenness in the thickness of a layer to be formed can be more effectively prevented. As a result, it is possible to produce the three-dimensional structure with higher dimensional precision and higher productivity.

As the post-treatment process, for example, a washing process, a shape adjusting process that performs deburring or the like, a coloring process, a coating layer forming process, or a process of completing curing a binder that performs a light irradiation treatment or a heat treatment for reliably curing an uncured binder can be exemplified.

Further, in the above-described embodiments, the method including the binding solution providing process and the curing process (bonding process) is mainly described, but the curing process (bonding process) does not need to be provided after the binding solution providing process in the case where a binder containing a thermoplastic resin is used for the binding solution (the binding solution providing process may serve as the bonding process). Further, in such a case, the apparatus for producing a three-dimensional structure may not include an energy irradiation unit (curing unit).

Further, in the above-described embodiments, the description is made that the flattening unit moves on the stage, but the positional relationship between the stage and the squeegee may be changed due to the movement of the flattening unit on the stage and the stage may be flattened.

Further, in FIGS. 5 and 6, the description is made that the dispenser moves on the stage, but the positional relationship between the stage and the dispenser is changed by the movement of the stage and thus the region for which the composition is provided may be prescribed.

Furthermore, in the above-described embodiments, the case where the apparatus for producing a three-dimensional structure includes plural dispensers is mainly described, but the apparatus for producing a three-dimensional structure may include one dispenser.

The entire disclosure of Japanese Patent Application No. 2014-054503 filed Mar. 18, 2014 is expressly incorporated by reference here in.

What is claimed is:

1. An apparatus for producing a three-dimensional structure that produces a three-dimensional structure by laminating layers to each other using a paste-like composition containing grains, the apparatus comprising:
a stage for which the paste-like composition is provided and which has a forming area on which the layers are to be formed and laminated; and
a dispenser that directly supplies the paste-like, composition to the forming area on the stage.

2. The apparatus for producing a three-dimensional structure according to claim 1, further comprising a plurality of the dispensers.

3. The apparatus for producing a three-dimensional structure according to claim 2, wherein the thicknesses of the layers to be formed are made different from one another with respect to a plurality of dispensers.

4. The apparatus for producing a three-dimensional structure according to claim 1, further comprising a flattening unit that flattens the composition supplied by the dispenser.

5. The apparatus for producing a three-dimensional structure according to claim 4, wherein the dispenser and the flattening unit are operated independently from each other.

6. The apparatus for producing a three-dimensional structure according to claim 4,
wherein the dispenser relatively moves in a movement direction relative to the stage and supplies the composition to the stage at the same time, and
the dispenser and the flattening unit are disposed along the movement direction.

7. The apparatus for producing a three-dimensional structure according to claim 4, wherein the flattening unit is rotatably provided in the outer circumference of an ejecting unit of the dispenser.

8. The apparatus for producing a three-dimensional structure according to claim 1,
wherein the composition contains a solvent, and
the apparatus for producing a three-dimensional structure includes an atmosphere adjusting unit that adjusts an atmosphere of a space for which the composition is provided for an atmosphere containing a constituent component of the solvent.

9. The apparatus for producing a three-dimensional structure according to claim 1, further comprising a binding solution providing unit that provides a binding solution used for bonding the grains to each other.

10. The apparatus for producing a three-dimensional structure according to claim 9,
wherein the binding solution contains a UV curable resin, and
the apparatus for producing a three-dimensional structure includes a UV irradiation unit.

11. A method of producing a three-dimensional structure which produces a three-dimensional structure using the apparatus for producing a three-dimensional structure according to claim 1.

12. A method of producing a three-dimensional structure which produces a three-dimensional structure using the apparatus for producing a three-dimensional structure according to claim 2.

13. A method of producing a three-dimensional structure which produces a three-dimensional structure using the apparatus for producing a three-dimensional structure according to claim 3.

14. A method of producing a three-dimensional structure which produces a three-dimensional structure using the apparatus for producing a three-dimensional structure according to claim 4.

15. A method of producing a three-dimensional structure that produces a three-dimensional structure using the apparatus for producing a three-dimensional structure according to claim 5.

16. A method of producing a three-dimensional structure comprising:

performing forming of layers for several times using a paste-like composition containing grains, the forming of the layers including directly supplying the paste-like composition to a forming area on a stage using a dispenser, the forming area being an area on which the layers are to be formed and laminated.

17. The method of producing a three-dimensional structure according to claim 16, wherein the forming of the layers is performed by flattening the composition using a flattening unit after the composition is provided for the forming area.

18. The method of producing a three-dimensional structure according to claim 16, comprising providing a binding solution for the layer to bond the grains to each other.

19. The method of producing a three-dimensional structure according to claim 16, wherein the composition contains a solvent, and the forming of the layer is performed in an atmosphere in which a constituent component of the solvent is included.

20. A three-dimensional structure which is produced using the apparatus for producing a three-dimensional structure according to claim 1.

\* \* \* \* \*